March 12, 1963     H. M. SIERRA     3,081,447
APPARATUS AND METHODS FOR AUTOMATIC INDEXING AND STORAGE
Filed April 10, 1961     10 Sheets-Sheet 1

*INVENTOR.*
HUGH M. SIERRA
BY *FRASER & BOGUCKI*
ATTORNEYS

March 12, 1963 H. M. SIERRA 3,081,447
APPARATUS AND METHODS FOR AUTOMATIC INDEXING AND STORAGE
Filed April 10, 1961 10 Sheets-Sheet 7
FIG. 9
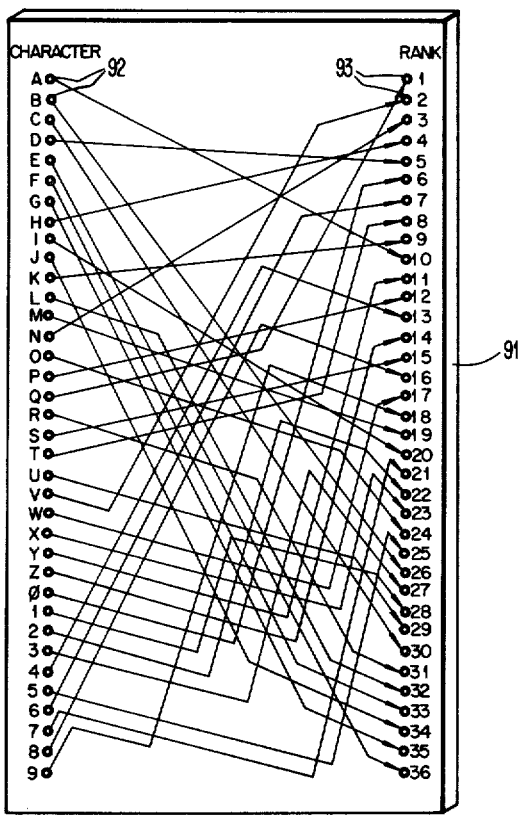
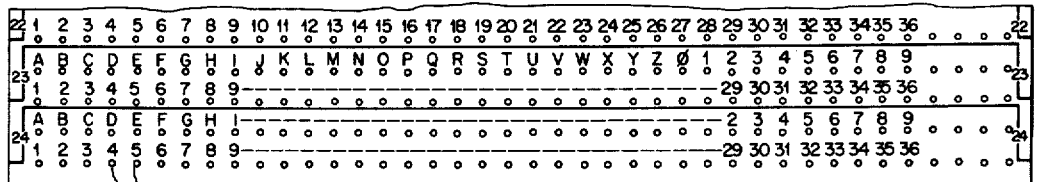
FIG. 11
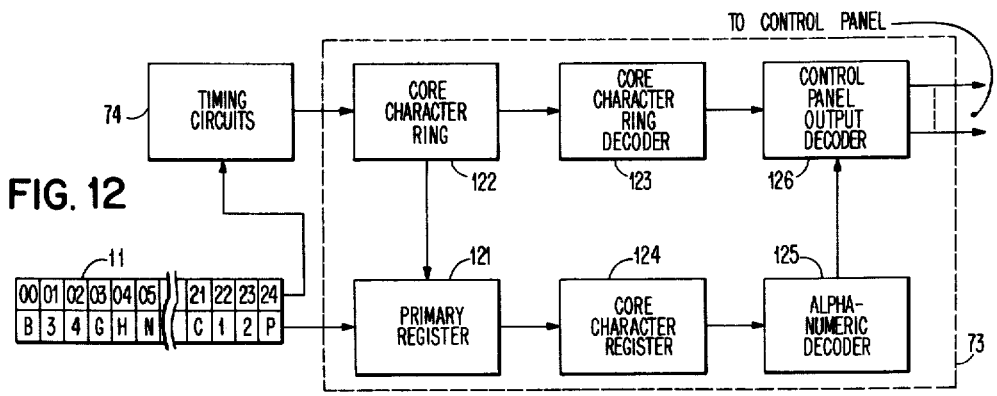
FIG. 12

United States Patent Office 3,081,447
Patented Mar. 12, 1963

---

3,081,447
APPARATUS AND METHODS FOR AUTOMATIC INDEXING AND STORAGE
Hugh M. Sierra, Santa Clara, Calif., assignor to International Business Machines Corporation, New York, N.Y., a corporation of New York
Filed Apr. 10, 1961, Ser. No. 101,809
29 Claims. (Cl. 340—172.5)

This invention relates to equipment and methods for indexing and storing information within a computer memory and more particularly to arrangements for relating the indexing to the statistical distribution of the information.

In the field of data processing a computer often handles data from a wide variety of sources. Since the data is usually identified in accordance with a numbering arrangement devised at the data source, it may be expected that some translation is necessary in order to adapt the data identification arrangement to the memory address system of the computer. A first step in the data handling process is the storage of the data within the computer memory. In the usual situation, the data is in the form of information bearing items, such as punched cards, which are to be assigned particular locations within the computer memory. Furthermore, it is desirable that this assignment be arranged so that the information bearing items may be readily retrieved when they are called for by the presentation of the item identification number. Where a relatively large number of such items are to be processed, as is usually the case, it is clearly inefficient to require a search of the entire memory in order to retrieve an individual item; moreover, since the number of items to be processed usually exceeds the number of memory addresses which is feasible, it has been customary to "compress" the information by assigning a plurality of information bearing items to each discrete memory address.

In one common arrangement in data processing systems, each item identifier consists of twenty-five symbols, each of which is one of the thirty-six alpha-numeric characters, i.e., the letters A through Z and the digits 0 through 9. Thus, there is a possibility of $36^{25}$ different combinations as item identifiers. The memory within which such information items are to be stored utilizes memory addresses of five decimal digits each, thus permitting only 100,000 memory addresses. Information is retrieved by designating a memory address corresponding to a particular item identifier and then searching through the items in the designated section of the memory to find the specific item which is sought.

Obviously, it is desirable from the standpoint of efficient utilization of the memory that there be a uniform distribution of data within the memory. In the past, the conversion of an alpha-numeric identifier to a numerical address was accomplished by a method called randomizing. This consisted of applying an arbitrary formula to the numeric portion of the identifier. This method has proven inefficient, time consuming, and relatively wasteful of memory space. Where memory space is wasted because some memory sections are incompletely filled while others overflow, it becomes necessary to provide additional equipment in the form of extra memory storage in order to take care of possible overflow. Thus, it can be seen that any arrangement which affords a more uniform distribution of data storage within a particular memory will effect savings in equipment required, time consumed in data retrieval, and cost and size of information storage equipment.

It is, therefore, an object of this invention to provide an improved arrangement for the storage of information in a computer memory.

It is a further object of this invention to provide for the uniform distribution of information items within a computer memory.

It is an additional object of this invention to provide an arrangement for translating the identifier of an item to be stored in a memory with a maximum probability of uniform storage in the memory.

More specifically, it is an object of this invention to apply the principles of statistical analysis to the population of item identifiers in order to effect a uniform distribution of items within a memory based on the relative frequency of occurrence of the identifier characters.

It is also an object of this invention to provide for the translation of alpha-numeric identifiers to numerical memory addresses by means of equipment which is readily adaptable to handle information items of different forms from a wide variety of sources having varying arrangements of alpha-numeric identifiers.

Considered broadly, the invention contemplates the division of the memory into a number of equal portions, othewise referred to as sections or buckets, and of giving each equal portion or section of the memory an equal probability of being occupied. This is accomplished, in accordance with the invention, by dividing the total area under a Gaussian or normal distribution probability curve into equal sub-areas and assigning to each sub-area a unique memory address. This memory address is related to the frequency distribution of the set of item identifiers in a manner which minimizes variations in the distribution of items in the respective memory sections. Furthermore, the relationship between the memory address generating equipment of the invention and the data to be stored is readily adjustable so that the equipment may be usable, without delay, with any set of identifiers.

Briefly, the invention involves a determination of the frequency distribution of the identifiers of a set of items which are to be stored and the operation on such information so as to convert it to a corresponding Gaussian probability curve in order that the items may be assigned to memory sections with equal probability. Initially the frequency distribution of the set of data which is to be processed is determined by sorting and tabulating the information bearing items according to the particular alpha-numeric character occurring in a given identifier position. In the event that the set consists of a very large number of information items, an estimate of the frequency distribution may be made by sorting and tabulating the items in a statistical sample of the complete set. The list of alpha-numeric characters for the selected identifier position is then ordered by beginning with the most frequent character and alternately ranging on opposite sides thereof the succeeding characters taken in the order of their respective frequencies of occurrence. If viewed on a graph as a plot of frequency of occurrence versus character, the result is a histogram having a peak in the center and receding on both sides. Each alpha-numeric character is then given a rank number beginning at one end of the histogram and continuing sequentially to the other end. Each frequency of occurrence number is transformed to a relative frequency of occurrence by taking the ratio of the particular number to the total number of items being processed. From these values a cumulative distribution function is obtained which for any rank consists of the sum of the relative frequency of occurrence values of all the ranks preceding it.

For a reason which will be explained below, the entire list of cumulative frequencies thus obtained is shifted slightly by deriving a series of midpoint cumulative frequencies as averages of each pair of adjacent cumulative frequency values. Once this list is derived, it is a simple matter to go from a list of cumulative frequencies to the corresponding Gaussian probabilities of occurrence by means of published statistical tables. Such a table, for example, appears at page 229 et seq. of the Handbook of Chemistry and Physics, thirty-fourth edition. From such a table a list of corresponding "$t$" values, or normal deviates, corresponding to the midpoint cumulative frequencies may be obtained. Similar information is derived for the frequency distribution of the characters in each identifier position so that in the case of identifiers utilizing twenty-five positions or digits there will be provided twenty-five lists of normal deviate values and twenty-five rankings of the alpha-numeric characters employed. The above described operations are commonly performed by the user prior to the presentation of the information which is to be processed in the computer. It may if desired, however, be performed as a first step of the data processing procedure.

Once the above information is applied to the memory addressing section of the computer, the system is ready to begin storing (or retrieving) the respective information items. As each item is presented its identifier is analyzed, character by character, in accordance with the above described statistical analysis of the item set. By appropriate operations corresponding to the mathematical steps described above, the structure of the invention automatically generates a memory address which corresponds to the particular identifier being examined and which is related statistically to the frequency distribution of the entire set. Thus, each section of the memory is caused to have an equal probability of occupancy for the respective items of the set so that the information is uniformly distributed over the memory with a minimum occurrence of overflow from any of the individual sections and a corresponding reduction in the additional equipment which must be provided to take care of memory overflow.

A better understanding of the invention may be had from a consideration of the following detailed description taken in conjunction with the drawings, in which:

FIG. 9 is a detailed schematic representation of another portion of the invention as depicted in FIG. 7;

FIG. 11 is a diagram of a portion of a control panel suitable for use with the arrangement of FIG. 8;

FIG. 12 is a more detailed representation of a portion of the arrangement of FIG. 7;

Figure 1:
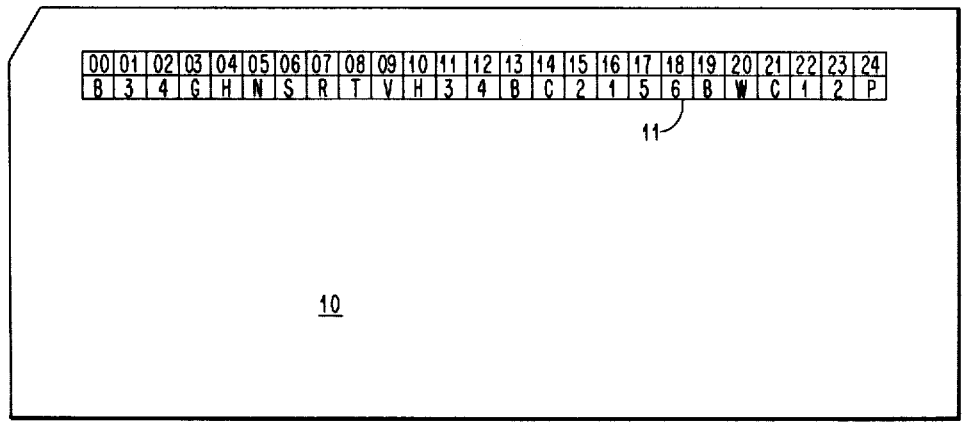
FIG. 1 is a representation of a typical item in the form of an accounting card bearing information to be stored in a computer memory associated with the invention.

Before beginning the detailed description of the invention it may be useful to review certain well-known principles of probability and statistics in order to provide a better understanding of the operation of the invention. These statistical principles and nomenclature may be found in almost any textbook on statistics, one such textbook being "Statistical Theory With Engineering Applications" by A. Hald.

The probability that a stochastic variable $x$ will take on a value less than or equal to a specified number $x_a$ is written $P\{x \leq x_a\}$. This probability, which is a function of $x_a$, will be written more briefly as $P\{x_a\}$; i.e.:

$$P\{x \leq x_a\} = P\{x_a\}$$

Usually the stochastic variable and the actual variable $x$ are denoted by the same letter if no confusion is likely. $P\{x_a\}$ is called the cumulative distribution function of the variable.

The probability that the stochastic variable $x$ takes on a value in the interval $x_a < x \leq x_b$ is written.

$$P\{x_a < x \leq x_b\} = P\{x_b\} - P\{x_a\} \tag{1}$$

The cumulative distribution function may be considered the successive addition of the individual values of a variable over the range of the variable. For a continuous variable $t$, normally distributed, the standardized cumulative distribution function may be represented by the expression $$\psi(t) = \frac{1}{\sqrt{2\pi}} \int_{-\infty}^{t} exp\left(\frac{-x^2}{2}\right) dx \tag{2}$$

where $exp$ represents the base $e$ of the natural system of logarithms taken to the exponent indicated in parentheses, in this case $$\frac{-x^2}{2}$$

The corresponding standardized normal distribution function, which is also referred to as the Gaussian curve, may be represented as $$\phi(t) = \frac{1}{\sqrt{2\pi}} exp\left(\frac{-t^2}{2}\right) \quad (3)$$

It can be seen that Equation 2 is the integral of Equation 3 between specified limits and that any particular value of the standardized cumulative distribution curve represents the area to the left of the corresponding ordinate of the standardized Gaussian curve. An example of a standardized cumulative distribution curve may be found in FIG. 4 and the corresponding Gaussian curve may be found in FIG. 5.

The normal, or Gaussian, distribution function which is a particular case of a continuous distribution is defined by $$P\{x\} = \frac{1}{\sqrt{2\pi}\sigma} exp\left[\frac{-(x-\xi)^2}{2\sigma^2}\right] (-\infty < x < +\infty) \quad (4)$$

where $\xi$ is the mean or average value of the variable and $\sigma$ is the standard deviation about the mean, $\sigma^2$, the square of the standard deviation, is called the variance and is often preferred as a parameter of the distribution in place of the standard deviation. For the Gaussian distribution function the probability that the variable is less than or equal to $t$ becomes $$P\{t\} = \frac{1}{\sqrt{2\pi}\sigma} \int_{-\infty}^{t} exp\left[\frac{-(x-\xi)^2}{2\sigma^2}\right] dx \quad (5)$$

By introducing a new variable $$u = \frac{x-\xi}{\sigma}$$

the standardized normal distribution function $\phi\{u\}$ of Equation 3 is obtained from Equation 4. Similarly, the standardized cumulative distribution function $\psi\{u\}$ of Equation 2 may be obtained from Equation 5 by such a change of variable. For the standardized normal distribution function, the mean $\xi = 0$ and the variance $\sigma^2 = 1$. The standardized normal distribution is symmetrical about the value of the variable equal to zero, and the entire curve representing the function over the extent of its range has an area of unity. Thus, the corresponding standardized cumulative distribution ranges from 0 to 1. By substituting 0 and 1 for $\xi$ and $\sigma$ respectively in Equations 5 and 4 it can be seen that these equations simplify to the standardized cumulative distribution function of Equation 2 and the standardized normal distribution function of Equation 3 respectively as shown above.

With this brief background, a detailed description of the invention will now be undertaken. The invention will be discussed in terms of a preferred embodiment which utilizes a particular type of magnetic storage memory comprising a plurality of magnetizable discs each having a plurality of information tracks thereon. It should be clearly understood, however, that the aspects of the invention relating to the automatic generation of memory addresses may be employed in other information storage systems utilizing various other types of memory structures. Accordingly, the scope of the invention is not intended to be limited by the particular memory structure which is described herein.

Furthermore, for simplicity, the description of the invention will be in the context of a system wherein information is initially presented usually in the form of holes in a series of stiff paper cards, commonly referred to as punched cards. Therefore, the invention can be thought of as providing a discrete memory address or index for each card of a set which is to be processed, thus permitting the information from an entire set of cards to be stored in the memory, once the information has been read off the cards and translated to a form which is suitable for storage in the associated memory. In accordance with the invention, information from the respective cards of the set is stored in particular locations of the memory which are related to the statistical distribution of the card identifiers so that each memory section has an equal probability of being filled. Storage in this manner facilitates the retrieval process considerably, since the information from a particular card may be retrieved from the memory by obtaining its memory address from the memory address generator upon presentation of the card identifier thereto in the same way that the address was generated upon storage, and then searching through the designated memory section until the information bearing the particular card identifier is located. By relating the memory addresses to the statistical distribution of the card identifiers in a particular set of cards, as will be described in accordance with the invention, storage in the memory is effected with a minimum of overflow from individual memory sections, the requisite translating equipment for locating the information corresponding to a particular identifier in the memory is simplified, and the storage apparatus is advantageously rendered readily adaptable for use with any set of information items while maintaining a maximum efficiency of storage.

Although the invention will be described in the above mentioned context, it should be clearly understood that its utility is not restricted thereto. The invention is equally applicable to the processing of information presented in a wide variety of forms, as for example, paper tapes, magnetic tapes, magnetically printed media and even information obtained directly from an operator's keyboard, so long as the tabulation of a statistical analysis of the presented information, or a suitable sample thereof, is available. All that is needed to adapt the invention to the processing of information presented in any medium is the provision of an information reader which can serve to translate the information from the presented medium to a form suitable for storage in the associated memory.

Referring now to the drawings, FIG. 1 represents a typical information bearing item 10, such as a punched card, which may be presented for storage within the memory unit of the system of the invention. The card 10 is shown bearing a representative alpha-numeric identifier 11 comprising twenty-five characters drawn from the set of twenty-six alphabetical letters and ten numerical digits. The twenty-five identifier positions are shown numbered from 00 to 24 and the respective characters shown therein are merely representative of a particular identifier which may correspond, for example, to a catalog part number, a name, an automobile engine number, or other information.

Figure 2:
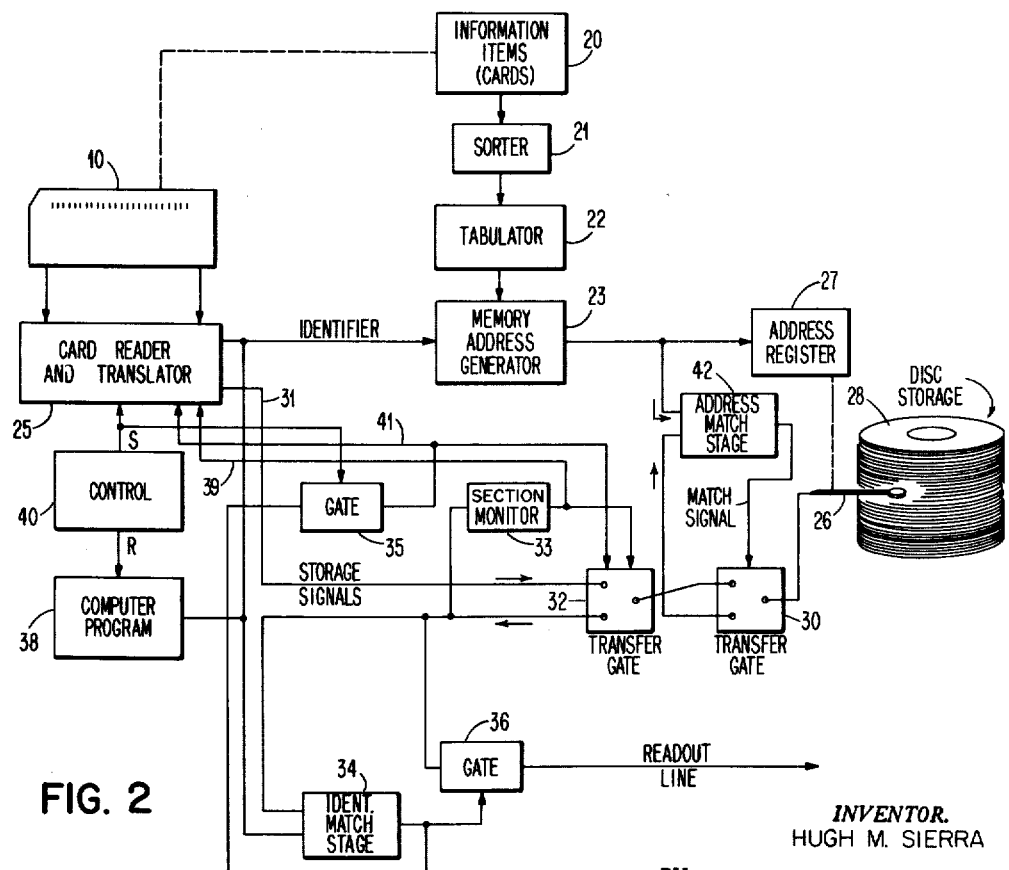
FIG. 2 is a block diagram representing a system in accordance with the invention.

FIG. 2 is a simplified block diagram representative of an information storage system in accordance with the invention. In FIG. 2 a memory address generator 23 is shown connected to an address register 27 which is arranged to control the position of a transducer arm 26 adjacent a disc storage memory unit 28. The memory address generator 23 receives data relating to the statistical analysis of a set of information items 20 from a tabulator 22 which is connected to a card sorter 21. The memory address generator 23 also receives information relating to a specific identifier from either a card reader and translator 25 or a computer program stage 38, both of which are responsive to a control stage 40.

The output of the memory address generator 23 is applied to the address register 27 and also to an address match stage 42 which controls a first transfer gate 30. A section monitor stage 33 controls a second transfer gate 32 which is connected to the first transfer gate 30. The transfer gate 32 is alternatively controlled by the output of a gate 35 which receives signals from an identifier match stage 34 and is itself responsive to the control stage 40. The identifier match stage 34 is connected to compare signals from the computer program stage 38 and the transfer gate 32 in order to control an output gate 36 which, when activated, applies information from the disc storage memory unit 28 to a read out line which serves as the output of the system. The tabulator 22 and the memory address generator 23 are shown connected by a dashed line in order to indicate that the statistical data from the tabulator 22 is presented at a different time from that at which the identifier is presented from either the card reader and translator 25 or the computer program stage 38.

In the operation of the system of FIG. 2, the information items 20 are directed to a sorter 21 which sorts all of the information items according to the alpha-numeric character which is found in a particular identifier position. Depending upon the number of information items that comprise a set which is to be stored in the memory, they may all be run through the sorter 21 or alternatively, a statistical sample of the set of information items may be sorted to serve as a basis for an estimate of the distribution of the entire set. After the cards 20 are sorted, they are run through a tabulation 22 which provides, as its output, data relative to the number of cards bearing the different alpha-numeric characters. This data from the tabulator 22 may be ocnsidered a series of frequency distributions for the respective identifier positions taken with respect to alpha-numeric character. This data is then presented to the memory address generator 23, which will be described in detail below, in order that an appropriate memory address may be provided when desired.

Once the data received from the tabulator 22 is stored within the memory address generator 23 in the form of statistical parameters derived from tabulated statistical distributions, the system is ready for the second phase of operation which relates to the direct storage and retrieval of information, such as may be contained on an individual card 10, within the disc storage memory unit 28 itself. The storage unit 28 is represented as a plurality of magnetizable discs which are adapted to store input information in particular locations thereon. In a preferred arrangement the storage unit 28 may comprise one hundred metallic discs coated on each side with a ferrous oxide material well known in the art as a suitable magnetic recording medium. Each side of each disc is arranged with one hundred concentric magnetic recording tracks, so that there are 20,000 such tracks in all, and each track is divided into five sectors or sections. Thus the memory unit 28 possesses a capacity of 100,000 sections, each of which will accommodate the storage of one hundred eight bit characters.

A five-digit file address, generated by the memory address generator 23, is utilized to select a given section to be read from or recorded into. Four of the five digits are used to control the address register 27 which is the access mechanism that positions the transducers associated with the arm 26 adjacent the desired track of the selected disc. The remaining digit controls the selection of the appropriate memory bucket. The discs are numbered 00 through 99 and are addressed by similar numbers. The tracks are identified by numbers 00 through 99, each number referring to corresponding tracks on both sides of a disc. Thus, each track includes ten records, i.e., five on each side of a disc, which are referred to and are addressed by the numbers 0 through 9. In the system of FIG. 2, the first four digits of the address from the memory generator are employed by the address register 27 to position the arm 26 while the remaining digit is utilized by the address match stage 42 to provide a selection of the address section. The first two digits of the memory address, therefore, control the address register 27 to position the transducer arm 26 opposite a selected disc. The next two digits of the memory address control the address register 27 to position the transducers of the arm 26 opposite the selected track of the selected disc. The last digit of the memory address controls which of the two transducers is selected for operation as well as causing a selection of the specific section by means of the address match stage 42.

With regard to the description of the address control and memory portion of the system of FIG. 2 contained in the previous paragraph, the operation thereof is identical, regardless of whether information is to be stored in or retrieved from the memory unit 28. The same is true with respect to the operation of the memory address generator 23 which will be covered in detail in connection with the description of FIG. 7. The operation of the system of FIG. 2 will now be described as it provides for the storage of a particular information item in the memory unit 28, to be followed by a description of the operation of the system during the retrieval of a particular information item from the memory unit 28.

Let it be assumed that the control stage 40 of FIG. 2 is set to effect the storage of information in the memory unit 28. A particular card 10 is applied to the card reader and translator 25 which ascertains the card identifier and applies it to the memory address generator 23. As has already been mentioned, the data relating to the statistical analysis of the particular set of information from which the card 10 is drawn has previously been presented by the tabulator 22 and stored within the memory address generator 23 in the form of a plurality of normal deviate values corresponding to character rank. Upon presentation of the identifier from the card reader and translator 25, the memory address generator 23 proceeds to operate upon the previously stored data in order to generate a corresponding five-digit memory address. As previously described, this address causes the address register 27 to position the transducers attached to the arm 26 opposite the particular track containing the section within which the information from the specific card 10 is to be stored.

It will be understood, of course, that the discs of the memory unit 28 are rotating constantly so that all five sections in the selected track pass under the appropriate transducer of the arm 26 in succession. These transducers are such that they record upon the magnetic track when energized and read therefrom when not energized. It may be mentioned that the transfer gates 30 and 32 are represented as providing a connection between the right hand terminal and the lower of the left hand terminals in the absence of a control signal applied to the gate. It will, therefore, be clear that signals previously recorded on the selected track of the memory unit 28 are read out and applied via the first transfer gate 30 as one input of the address match stage 42. These signals represent information of three types: namely, signals which serve to designate the particular sections of the track, signals which correspond to the identifier of a particular information item stored in the section, and signals which represent the information that has been transferred to the selected section of the memory unit 28 from an individual information item 10.

As these various signals are directed to the stage 42, they are compared with a representation of the section selection digit of the five-digit address provided by the memory address generator 23. When a match is detected, signifying that the transducer has reached the designated memory section, a match signal is applied from the address match stage 42 to the transfer gate 30 which serves to transfer the connection within the gate 30 to the upper left hand terminal thereof. The signals are then applied by means of the transducers on the arm 26 from the selected storage track through the transfer gate 30 via the upper left hand terminal thereof, thence through the transfer gate 32 to the lead connected to the lower left hand terminal of the gate 32.

A particular information item 10 may represent information not yet stored in the storage unit 28 or it may call for a change in information previously stored therein as, for example, when a particular record of an inventory item is to be changed from a corresponding record for a previous period. If the information is to be initially stored, an empty space within a memory section must be located; while if previously stored information is to be changed, the position where that information is presently stored must be located so that the new information may be recorded over the previously stored record. For purposes of illustration, assume first that an information item is to be initially stored. As the transducer of the arm 26 passes adjacent information which may be already stored in the selected section of the memory unit 28, signals from the transducer are fed to the section monitor 33 which "listens" for an empty portion which may be available for storage within a designated section. When such a portion is reached by the transducer, the signals from the transducer on the arm 26 are terminated; and the section monitor 33 responds by applying a transfer signal to the transfer gate 32, shifting the connection within the gate 32 to the upper left hand terminal thereof, and simultaneously applying a signal via the lead 39 to the card reader and translator 25. Upon receipt of the signal from the section monitor 33, the card reader and translator 25 proceeds to apply signals representative first of the card identifier and then of the information contained on the specific card 10 over the lead 31 connected to the upper left hand terminal of the transfer gate 32 through the transfer gates 32 and 30 and thence to actuate the transducer on the arm 26 in order to store these signals within the storage region of the addressed section of the memory unit 28. During this step the gate 35 and the stage 34 perform no function because there is no requirement for an identifier comparison.

When the card 10 carries information to be recorded in place of already stored information, however, the identifier from the card reader and translator 25 is applied to the identifier match stage 34 in addition to the memory address generator 23. The locating and monitoring of the addressed section proceeds in the manner described above. Now, however, there is a match between the item 10 identifier and one of the item identifiers stored in the section. When the signals read out and applied to the identifier match stage 34 match the corresponding signals from the card reader and translator 25, the stage 34 sends a signal via the gate 35 (previously enabled by a store signal from the control stage 40) to the lead 41. This signal on the lead 41 is applied to the transfer gate 32 to switch its connection to the upper left hand terminal thereof in preparation for receiving stored signals on the lead 31. The lead 41 also applies the signal to the card reader and translator 25, directing it to store the new information from the particular card 10 (without the identifier) in the appropriate section location. When the information has been thus stored within the selected memory section, the system is ready to store information from another card 10 or may be utilized to retrieve information from sections within the memory unit 28.

To retrieve information from a particular storage section within the memory unit 28 of FIG. 2, the control stage 40 is set to apply a retrieve signal to the computer program stage 38. This causes the latter to apply a specific identifier, corresponding to the particular information which is to be retrieved, to the memory address generator 23 and also to the identifier match stage 34. The memory address generator 23 thereupon provides a corresponding section address in the same manner in which it operates during the storage phase. The generated section address thereafter causes the address register 27 to control the arm 26 so as to position the associated transducers adjacent the appropriate track of the particular disc within the memory unit 28. The signals recorded on this track are then read out and passed through the transfer gate 30 via the lower left hand terminal thereof and thence to the address match stage 42. When a match is detected therein, signifying that the transducer has reached the particular section corresponding to the generated address, a match signal from the stage 42 applied to the transfer gate 30 causes a connection to be made between the transducer and the upper left hand terminal of the gate 30 which is conected to the transfer gate 32. As before, the signals generated by the transducer in correspondence with the information carried on the selected track within the selected memory section are directed to the lower left hand terminal of the transfer gate 32. At this time the function of the section monitor 33 is of no consequence. The read out signals are applied to the identifier match stage 34 and to the input of the gate 36 controlled thereby. When the identifier match stage 34 detects a match between the signals received from the memory unit 28 and the particular identifier signals received from the computer program 38, an energizing signal is directed to the gate 36 which permits it to pass the signals from the memory unit 28 to the read out line connected at its output.

By means of the operation just described the system of FIG. 2 generates a particular memory address corresponding to a submitted identifier. If this identifier is received from the card reader and translator 25, signifying that information is to be stored within the memory, the address is used to select a particular section or segment of the memory, which is then monitored until the appropriate storage area is located therein after which the information to be stored is transmitted to the magnetic storing transducer. If the particular identifier is applied from a computer program, signifying that information within a corresponding section of the memory is to be retrieved, the address is similarly utilized as in the storage process to select the appropriate section within the memory unit 28. Thereafter, the information already stored within this section is monitored until a match is detected between identifier signals from the section and signals representative of the selecting identifier. The information corresponding to the appropriate identifier is then read out of the memory unit 28 and applied as an output of the system.

Figure 3:
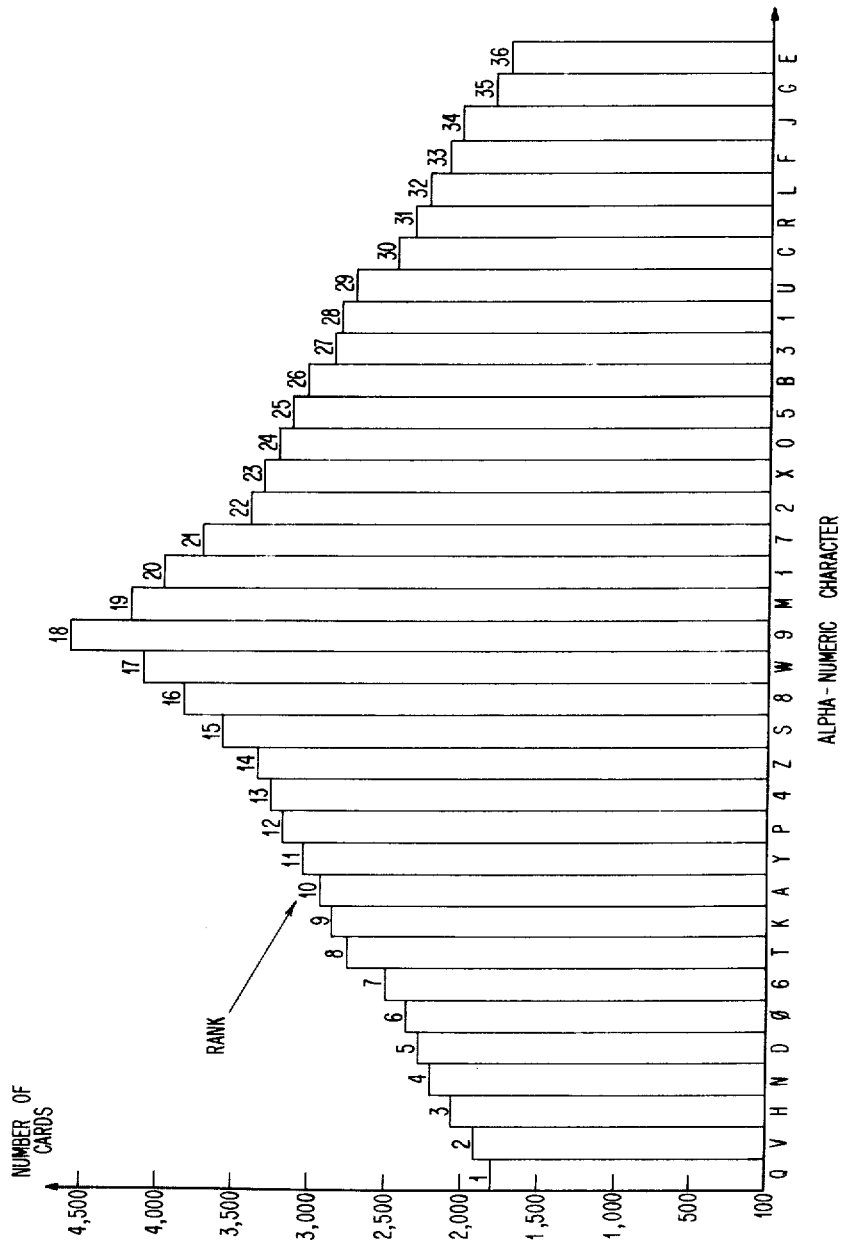
FIG. 3 is a plot of an arrangement of data at one stage in the practice of the invention.

The memory address corresponding to any particular item identifier from the entire set of information items may be developed in accordance with the invention by the practice of the following method and by means of the structure which is hereinafter described for practicing this method. As already described above, the statistical data relating to a particular set of informaiton items, i.e., the frequency distributions with respect to alpha-numeric character for the respective identifier positions, is received by the memory address generator 23 of FIG. 2 from the tabulator 22. This data is first employed to develop, a particular ordering of the alpha-numeric characters in a manner which may best be understood by reference to FIG. 3, which is a histogram of the frequency of occurrence with respect to alpha-numeric character for the characters found in position 03 of a specific set of cards which may be employed as an example. The histogram of FIG. 3 is prepared by placing the most numerous character in the center and then proceeding in both directions therefrom in the order of frequency of occurrence, alternately ranging the characters first on one side and then on the other side of the most numerous character. Finally a numerical rank from 1 to 36 is assigned to each of the alpha-numeric characters in the order in which they are found in the histogram of FIG. 3. From the information received from the tabulator 22 and arranged in the manner just described, the following Table I may be prepared:

TABLE I

*Table for Identifier Position 03*

| 1 | 2 | 3 | 4 | 5 | 6 | 7 | 8 | 9 |
|---|---|---|---|---|---|---|---|---|
| Rank | Char. | Number of Cards | Cumulative Number $N_c$ | Cumulative Frequency $F_c$ | $F_{cn}+F_{c(n-1)}$ | Midpoint Cumulative Frequency | $t$ (From the table) | $\phi(t)$ (From the table) |
| 1 | Q | 1838 | 1,838 | 0.017553 | 0.017553 | 0.008777 | −2.38 | 0.023 |
| 2 | V | 1931 | 3,769 | 0.035994 | 0.053547 | 0.026774 | −1.93 | 0.062 |
| 3 | H | 2081 | 5,850 | 0.055868 | 0.091862 | 0.045931 | −1.68 | 0.097 |
| 4 | N | 2226 | 8,076 | 0.077127 | 0.132995 | 0.066498 | −1.51 | 0.128 |
| 5 | D | 2303 | 10,379 | 0.099120 | 0.176247 | 0.088124 | −1.35 | 0.160 |
| 6 | Zero | 2381 | 12,760 | 0.121859 | 0.220979 | 0.110489 | −1.23 | 0.187 |
| 7 | 6 | 2530 | 15,290 | 0.146021 | 0.267880 | 0.133940 | −1.11 | 0.216 |
| 8 | T | 2796 | 18,086 | 0.172723 | 0.318744 | 0.159372 | −1.00 | 0.242 |
| 9 | K | 2875 | 20,961 | 0.200179 | 0.372902 | 0.186451 | −0.89 | 0.269 |
| 10 | A | 2962 | 23,923 | 0.228467 | 0.428646 | 0.214323 | −0.79 | 0.292 |
| 11 | Y | 3088 | 27,011 | 0.257958 | 0.486425 | 0.243213 | −0.70 | 0.312 |
| 12 | P | 3209 | 30,220 | 0.288604 | 0.546562 | 0.273281 | −0.60 | 0.333 |
| 13 | 4 | 3287 | 33,507 | 0.319995 | 0.608599 | 0.304300 | −0.51 | 0.350 |
| 14 | Z | 3362 | 36,869 | 0.352102 | 0.672097 | 0.336049 | −0.42 | 0.365 |
| 15 | S | 3602 | 40,471 | 0.386502 | 0.738604 | 0.369302 | −0.33 | 0.378 |
| 16 | 8 | 3861 | 44,332 | 0.423375 | 0.809877 | 0.404939 | −0.24 | 0.388 |
| 17 | W | 4134 | 48,466 | 0.462855 | 0.886230 | 0.443115 | −0.14 | 0.395 |
| 18 | 9 | 4658 | 53,124 | 0.507339 | 0.970194 | 0.485097 | −0.04 | 0.3986 |
| 19 | M | 4221 | 57,345 | 0.547650 | 1.054989 | 0.527495 | 0.07 | 0.398 |
| 20 | 1 | 3982 | 61,327 | 0.585679 | 1.133329 | 0.566665 | 0.17 | 0.393 |
| 21 | 7 | 3740 | 65,067 | 0.621396 | 1.207075 | 0.603538 | 0.26 | 0.386 |
| 22 | 2 | 3411 | 68,478 | 0.653971 | 1.275367 | 0.637684 | 0.35 | 0.375 |
| 23 | X | 3330 | 71,808 | 0.685773 | 1.339744 | 0.669872 | 0.44 | 0.362 |
| 24 | 0 | 3243 | 75,051 | 0.716744 | 1.402517 | 0.701259 | 0.53 | 0.347 |
| 25 | 5 | 3174 | 78,225 | 0.747056 | 1.463800 | 0.731900 | 0.62 | 0.329 |
| 26 | B | 3071 | 81,296 | 0.776385 | 1.523441 | 0.761721 | 0.71 | 0.310 |
| 27 | 3 | 2891 | 84,187 | 0.803994 | 1.580379 | 0.790190 | 0.81 | 0.287 |
| 28 | 1 | 2854 | 87,041 | 0.831250 | 1.635244 | 0.817622 | 0.91 | 0.264 |
| 29 | U | 2780 | 89,821 | 0.857799 | 1.689049 | 0.844525 | 1.01 | 0.239 |
| 30 | C | 2463 | 92,284 | 0.881321 | 1.739120 | 0.869560 | 1.12 | 0.213 |
| 31 | R | 2347 | 94,631 | 0.903735 | 1.785056 | 0.892528 | 1.24 | 0.185 |
| 32 | L | 2258 | 96,889 | 0.925299 | 1.829034 | 0.914517 | 1.37 | 0.156 |
| 33 | F | 2132 | 99,021 | 0.945660 | 1.870959 | 0.935480 | 1.52 | 0.126 |
| 34 | J | 2067 | 101,088 | 0.965400 | 1.911060 | 0.955530 | 1.70 | 0.094 |
| 35 | G | 1861 | 102,949 | 0.983173 | 1.948573 | 0.974287 | 1.95 | 0.059 |
| 36 | E | 1762 | 104,711 | 1.000000 | 1.983173 | 0.991587 | 2.39 | 0.023 |

In the data shown in Table I an actual sample of 104,711 cards was employed. This number is far below the capacity of the computer memory but will serve to illustrate particular principles employed in the practice of the invention. The card identifiers have twenty-five identifier positions. Each identifier is to be transformed in accordance with the invention to a five-digit memory address number so that each memory section has an equal probability of being filled as the information items are stored in the memory.

In Table I, the first column indicates the rank of the corresponding character of column number 2 as developed from the ordering of the tabulated data in the manner described in connection with FIG. 3. Column 3 lists the corresponding frequency of occurrence for the respective alpha-numeric characters. Column 4 lists the cumulative number $N_c$ and is derived by adding for each rank the corresponding number of cards from column 3 to the preceding cumulative number in column 4. For rank 1 the cumulative number equals the number of cards for this rank which is 1838 in this case. For rank 2 the cumulative number $N_c$ is equal to the number of cards for rank 2, 1931, added to the previous cumulative number, 1838, for a total of 3769. The remaining cumulative numbers are derived in similar fashion with the cumulative number corresponding to rank 36 being equal to the total number N of cards employed in the sample.

The numbers of column 4 are then transformed to cumulative frequency values $F_c$ found in column 5 by dividing each corresponding number $N_c$ by the total number of cards N, which is 104,711 in this example. Notice that for the last rank, since the cumulative number is N, the cumulative frequency is $$\frac{N}{N}=1$$

This presents a problem because for the cumulative frequency $\psi(t)=1$, derived from Equation 2 above, $t$ is equal to infinity. To avoid this problem in statistical analysis the obtained values are shifted slightly. This is accomplished by obtaining an intermediate cumulative frequency which is a midpoint frequency between the frequency under consideration and the one immediately preceding. The process involves obtaining an average of two adjacent cumulative frequencies and is done by adding the values of each pair of adjacent cumulative frequencies and dividing the result by two. Column 6 lists the corresponding sums of each pair of adjacent cumulative frequencies $F_c$ found in column 5 and is represented by the function $F_{cn}+F_{c(n-1)}$. $F_{cn}$ represents the cumulative frequency of the rank under consideration while $F_{c(n-1)}$ represents the cumulative frequency of the rank previous to the one under consideration. For rank 1 there is no preceding rank so the value of $F_c+0$ is obtained. For rank 2 the value in column 6 corresponds to the sum of $F_c$ for rank 2 plus $F_c$ for rank 1 and so on.

Each value found in column 7 which is a corresponding midpoint cumulative frequency is simply the sum found in column 6 for that rank divided by 2. In other words, the values in column 7 are only half of the corresponding values in column 6. These midpoint cumulative frequencies are the values which are used for the $\psi(t)$ functions derived in accordance with Equation 2.

The values in column 8 are derived from the corresponding values of the midpoint cumulative frequency found in column 7 by referring to a statistical table of $\psi(t)$ such as may be found, for example, in "Tables of Probability Functions," vol. II, by Arnold N. Lowan.

Figure 4:
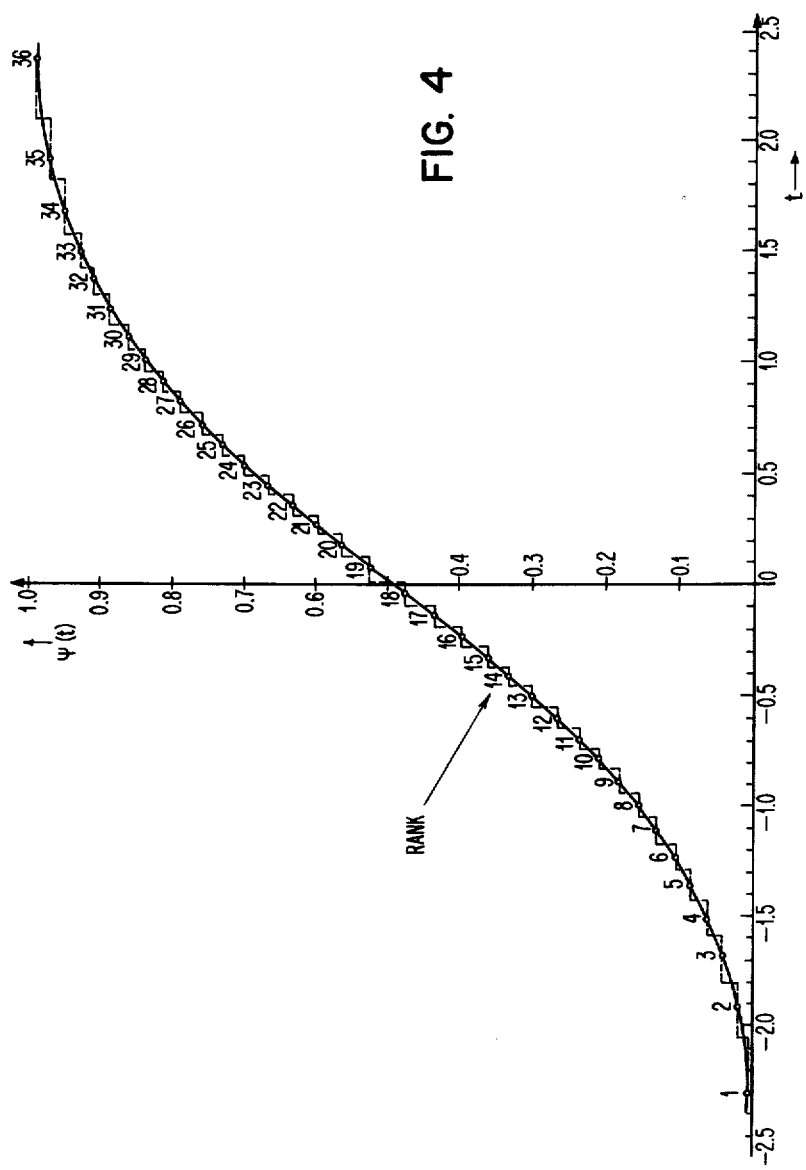
FIG. 4 is a graph of data derived from the information presented in FIG. 3.

FIG. 4 is a plot of a normalized cumulative distribution function for a continuous variable upon which the data of columns 1, 7 and 8 of Table I have been superimposed. The individual points plotted along the smooth curve correspond to the midpoint cumulative frequencies of column 7 from the table and are plotted with respect to the corresponding $t$ values shown in column 8. The plotted points are further designated by the corresponding rank as listed in column 1.

Once the $t$ values of column 8 are established, the corresponding $\phi(t)$ values defined by Equation 3 above may be entered in column 9 from the same statistical table from which the values of $t$ in column 8 were taken. A plot of the values listed in column 9 may be found in FIG. 5 which is a plot of the standardized Gaussian distribution function upon which the discrete values of $\phi(t)$ listed in column 9 of Table I have been superimposed.

Figure 5:
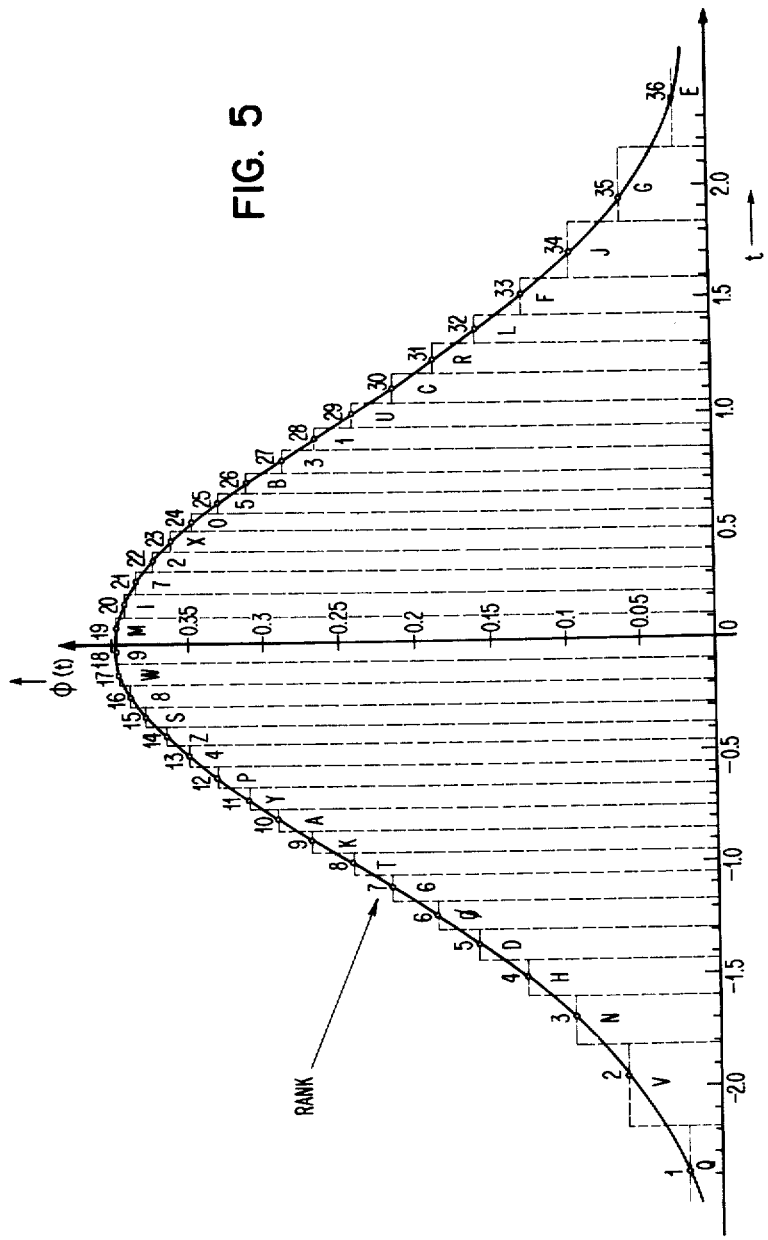
FIG. 5 is a graph of the Gaussian distribution curve corresponding to the graph of FIG. 4.

The graphs of FIGS. 3 and 5 may now be compared. Although the coordinate scales of both figures are entirely different, the similarity between their shapes is readily apparent. The histogram of FIG. 3 has been converted into the Gaussian curve of FIG. 5. This conversion has a dual purpose: to help in filling the system memory uniformly; and to obtain $t$ values (normal deviates) which will be useful for further analysis.

The Gaussian distribution curve of FIG. 5 represents the probability density for a particular variable taken over the range of the variable. Thus, given a particular range of the variable centered about a selected normal deviate value ($t$), the probability that the variable will fall within the limits of this range can be readily determined; in fact the probability is proportional to the area circumscribed by the intersected portions of the curve and the base line and by the limits of the range. Or, considered another way, the limits of the range can readily be determined when a selected normal deviate value and a given probability of occurrence are specified.

It has already been stated above that the data contained in Table I and the standardized normal cumulative distribution curve of FIG. 4 relate to the frequency of occurrence of the respective alpha-numeric characters for only one of the twenty-five identifier positions, in this case, position 03. Furthermore, it has been stated that similar information is provided for each one of the twenty-five identifier positions. The next step is to combine the statistical information for all of the identifier positions in order to obtain a uniform memory distribution. In order to explain the way in which this combination can be obtained resort will be had to principles of the theory of probability and the properties of the cumulative distribution function.

A proof of the Addition Theorem for a normal distribution can be found in many textbooks on statistics, e.g., "Statistical Theory With Engineering Applications," by A. Hald, pages 214 to 216. This theorem states:

If the variables $x_1$, $x_2$, $x_3$, . . . , $x_n$ are stochastically independent and normally distributed with parameters $$(\xi_1, \sigma_1^2); (\xi_2, \sigma_2^2); \xi_3, \sigma_3^2); \ldots ; (\xi_n, \sigma_n^2) \quad (6)$$

the variable $$x = \alpha_1 x_1 + \alpha_2 x_2 + \alpha_3 x_3 + \ldots \alpha_n x_n \quad (7)$$

will then be normally distributed with parameters ($\xi$, $\sigma^2$) given by $$\xi = \alpha_1 \xi_1 + \alpha_2 \xi_2 + \alpha_3 \xi + \ldots \alpha_n \xi \quad (8)$$

$$\sigma^2 = \alpha_1^2 \sigma_1^2 + \alpha_2^2 \sigma_2^2 + \alpha_3^2 \sigma_3^2 + \ldots \alpha_n^2 \sigma_n^2 \quad (9)$$

If $$\alpha_1 = \alpha_2 = \alpha_3 = \ldots = \alpha_n = \frac{1}{n}$$

where $n$ equals the number of identifier positions contributing the memory address ($n \leq 25$), then Equation 7 becomes the arithmetic average of the variables $x_1$, $x_2$, $x_3$, . . . $x_n$. Similarly, Equation 8 becomes the arithmetic average of the means $\xi_1$, $\xi_2$, $\xi_3$, . . . $\xi_n$ of the respective individual distributions. Equation 9 becomes $$\sigma^2(x) = \frac{1}{n}\left(\frac{\sigma_1^2}{n} + \frac{\sigma_2^2}{n} + \frac{\sigma_3^2}{n} + \cdots \frac{\sigma_n^2}{n}\right) = \frac{1}{n} \cdot \overline{\sigma^2(x)} \quad (10)$$

which indicates that the variance of the variable $x$ equals $$\frac{1}{n}$$

times the average variance of the variable.

For each one of the twenty-five identifier positions there is a standardized normal cumulative distribution curve; i.e.;

$$\sigma_1^2(x) = 1; \sigma_2^2(x) = 1; \sigma_3^2(x) = 1; \ldots \sigma_n^2(x) = 1 \quad (11)$$

In that case, $\sigma^2(x) = 1$ and the variance of the arithmetic mean will be $$\frac{1}{n}$$

resulting in the relationship that the standard deviation of the arithmetic mean $\sigma(\bar{x})$ is equal to $$\frac{1}{\sqrt{n}}$$

The above is summarized in another theorem which states that the standard deviation of the arithmetic mean, also known as the standard error of the arithmetic mean, is equal to $$\frac{1}{\sqrt{n}}$$

times the standard deviation of the observations and no other estimate of $\xi$ exists with a smaller standard error. As applied to the present situation this statement implies that the probability of error may be diminished, and indeed may be minimized, by resort to the frequency of occurrence distribution for all of the twenty-five identifier positions rather than by mere reliance upon the frequency of occurrence distribution for only one position. Even though there may not be expected any great variations in the parameters of the distributions for different identifier positions, what happens when a number of such distributions are combined is that the errors occurring in one distribution tend to be compensated for by similar errors in another distribution, so that all of these errors tend to cancel each other when the Addition Theorem is employed.

Furthermore, it must be understood that in many cases the data submitted from a particular source, e.g., a computer customer, is not permanently static. For example, oftentimes the data may refer to a manufacturer's inventory, in which case as new part numbers are added and obsolete ones deleted the parameters of the twenty-five normal distributions may be expected to change. By taking all of the twenty-five individual distributions into account, however, the errors occurring from reconsideration of the frequency of occurrence distribution for only one identifier position and also the changes in the part numbers due to deletions and accretions tend to cancel each other out when all of the distributions are combined into one composition of data. Thus the resultant error obtained is the theoretical minimum and the reason for using all of the twenty-five normal distribution curves is to minimize the expected error.

By applying the above stated Addition Theorem, we may obtain the standard deviation of the arithmetic mean for any particular item identifier which may be presented. For example, suppose that the item 10 of FIG. 1 having the identifier 11 is presented in order that the corresponding memory address may be derived. This identifier 11 has the letter G in the identifier position 03. From columns 2 and 8 of Table I, which has already been stated to be a treatment of the distribution of alpha-numeric characters found in the identifier position 03, it can be seen that the character G (rank 35) has a $t$ value of 1.95. It has already been indicated that similar tables are prepared for each of the twenty-five identifier positions. Thus for each alpha-numeric character in the identifier 11 of FIG. 1, there exists a particular $t$ value which is available by reference to the appropriate table. Suppose that from the table for identifier position 00, it is found that the alpha-numeric character B carries a corresponding $t$ value $t_{00}$ equal to 0.24. Similarly, suppose that from the table for identifier position 01, it is determined that the character 3 carries a $t$ value $t_{01}$ equal to 1.15. In a similar fashion the appropriate $t$ values for all twenty-five positions may be obtained; let it be assumed that they correspond to the values listed in the following Table II:

TABLE II

*Table of Representative Index vs. Corresponding t Values*

| Ident. position | Character | t |
|---|---|---|
| 00 | B | 0.24 |
| 01 | 3 | 1.15 |
| 02 | 4 | 1.42 |
| 03 | 6 | 1.98 |
| 04 | H | 0.28 |
| 05 | N | 0.17 |
| 06 | 8 | 1.72 |
| 07 | R | −1.15 |
| 08 | T | 0.41 |
| 09 | V | 1.40 |
| 10 | H | 1.10 |
| 11 | 3 | −1.49 |
| 12 | 4 | 0.43 |
| 13 | B | −2.03 |
| 14 | C | 0.83 |
| 15 | 2 | −0.12 |
| 16 | 1 | −0.78 |
| 17 | 5 | 1.11 |
| 18 | 6 | 1.11 |
| 19 | B | −1.04 |
| 20 | W | 0.36 |
| 21 | C | 0.02 |
| 22 | 1 | 1.26 |
| 23 | 2 | 0.83 |
| 24 | P | 1.15 |

We now use this information in resorting to the statement derived above in connection with the Addition Theorem, Equations 10 and 11, that the standard deviation of the arithmetic mean is equal to $$\frac{1}{\sqrt{n}}$$

times the standard deviation of the observations. Thus we are able to obtain the standard deviation of the arithmetic mean for the $t$ values listed in Table II, which will be designated $d_m$:

$$d_m = \frac{1}{\sqrt{25}}(0.24+1.15+1.42+1.98+0.28+0.17+1.72$$
$$-1.15+0.41+1.40+1.10-1.49+0.43-2.03+0.83$$
$$-0.12-0.78+1.11+1.11-1.04+0.36+0.02+1.26$$
$$+0.83+1.15) = \frac{10.36}{5} = 2.07 \quad (12)$$

Figure 6:
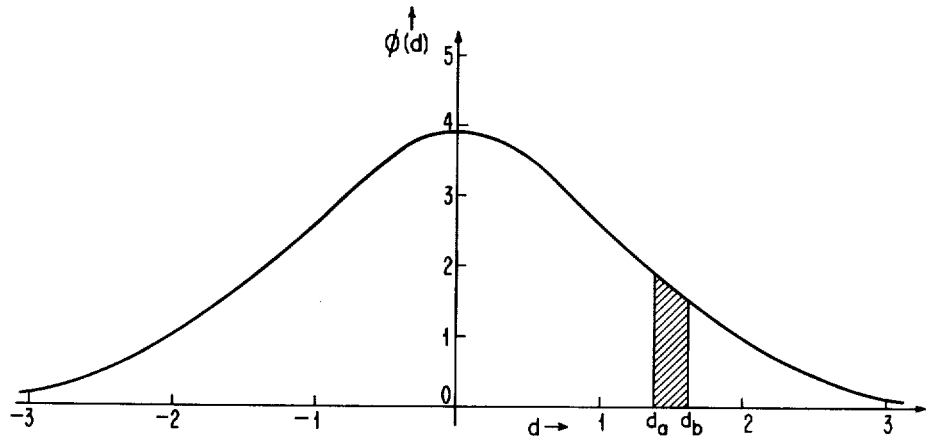
FIG. 6 is a graph which is useful in the explanation of the operation of the invention.

The time has now arrived to apply an inverse transformation in order to compute the memory address corresponding to a particular information item identifier. Reference is made to FIG. 6 which depicts a standardized Gaussian or normal distribution curve, corresponding to the function of Equation 3 represented as a distribution of the variable $d$. The probability that a stochastic variable $d$ will take on a value between two given numbers $d_a$ and $d_b$ is represented in FIG. 6 by the area enclosed by the curve, the $d$ axis, and the ordinates through $d_a$ and $d_b$ as shown by the shaded portion. This area is equal to $$P\{d_a < d \leq d_b\} = P\{d_b\} - P\{d_a\} = \int_{d_a}^{d_b} p\{d\} dd \quad (13)$$

and as a result of the Addition Theorem we have for $p\{d\}$ the Gaussian curve $$p\{d\} = \phi(d) = \frac{1}{\sqrt{2\pi}} exp\left(\frac{-d^2}{2}\right) \quad (14)$$

so that the area is given by $$P\{d_a < d \leq d_b\} = \int_{d_a}^{d_b} \frac{1}{\sqrt{2\pi}} exp\left(\frac{-d^2}{2}\right) dd \quad (15)$$

Let us assume that the memory under consideration has 100,000 individual sections in which information items are to be segregated. Each section is designated and retrieved by a five-digit number (00000 to 99999) which is the section address. Each of the 100,000 numbers determines a well defined portion of the memory. Since all portions are equal, it is desired to give to each one an equal opportunity or an equal probability of being filled. Since the probability is given by the area under the Gaussian distribution curve, the entire area under the Gaussian curve can be divided into 100,000 equal sub-areas and to each of these sub-areas one of the numbers from 00000 to 99999 can be assigned corresponding to the section address.

It has been demonstrated that the area under the Gaussian curve of FIG. 6 is given by Equation 15. Since it is common in tables of statistical data to use minus infinity as the lower limit of integration, Equation 15 can be modified thus:

$$P\{d_a < d \leq d_b\} = \int_{-\infty}^{d_b} \frac{1}{\sqrt{2\pi}} exp\left(\frac{-d^2}{2}\right) dd$$
$$-\int_{-\infty}^{d_a} \frac{1}{\sqrt{2\pi}} exp\left(\frac{-d^2}{2}\right) dd \quad (16)$$

It now remains to choose the limits $d_a$ and $d_b$ so as to divide the area into 100,000 equal sub-areas. By labeling the sub-areas with numbers from 00000 to 99999 a list, of which the following Table III is representative, is obtained:

TABLE III

*Table of Limits of Sub-Areas and Corresponding Section Addresses*

| $\frac{1}{\sqrt{2\pi}}\int_{-\infty}^{d_a} exp\left(\frac{-d^2}{2}\right) dd$ | $\frac{1}{\sqrt{2\pi}}\int_{-\infty}^{d_b} exp\left(\frac{-d^2}{2}\right) dd$ | Section Address |
|---|---|---|
| 0.00000000 ... | 0.000009999 ... | 00000 |
| 0.00001000 ... | 0.000019999 ... | 00001 |
| 0.00002000 ... | 0.000029999 ... | 00002 |
| 0.00003000 ... | 0.000039999 ... | 00003 |
| 0.00004000 ... | 0.000049999 ... | 00004 |
| 0.00005000 ... | 0.000059999 ... | 00005 |
| 0.00006000 ... | 0.000069999 ... | 00006 |
| 0.00007000 ... | 0.000079999 ... | 00007 |
| 0.00008000 ... | 0.000089999 ... | 00008 |
| 0.00009000 ... | 0.000099999 ... | 00009 |
| 0.00010000 ... | 0.000109999 ... | 00010 |
| 0.00011000 ... | 0.000119999 ... | 00011 |
| . | . | . |
| . | . | . |
| 0.98071000 ... | 0.980719999 ... | 98071 |
| 0.98072000 ... | 0.980729999 ... | 98072 |
| 0.98073000 ... | 0.980739999 ... | 98073 |
| 0.98074000 ... | 0.980749999 ... | 98074 |
| 0.98075000 ... | 0.980759999 ... | 98075 |
| 0.98076000 ... | 0.980769999 ... | 98076 |
| 0.98077000 ... | 0.980779999 ... | 98077 |
| 0.98078000 ... | 0.980789999 ... | 98078 |
| 0.98079000 ... | 0.980799999 ... | 98079 |
| 0.98080000 ... | 0.980809999 ... | 98080 |
| . | . | . |
| . | . | . |
| 0.99992000 ... | 0.999929999 ... | 99992 |
| 0.99993000 ... | 0.999939999 ... | 99993 |
| 0.99994000 ... | 0.999949999 ... | 99994 |
| 0.99995000 ... | 0.999959999 ... | 99995 |
| 0.99996000 ... | 0.999969999 ... | 99996 |
| 0.99997000 ... | 0.999979999 ... | 99997 |
| 0.99998000 ... | 0.999989999 ... | 99998 |
| 0.99999000 ... | 0.999999999 ... | 99999 |

A revision of Table III shows a significant fact: the section address is given by the first five decimal digits of either integral or by any value between these two limits. In other words, the entire area of the Gaussian curve has been divided into 100,000 equal sub-areas and in Table III there are supplied in columns 1 and 2 thereof the upper and lower limits respectively of these sub-areas. By the use of Formula 15 or 16 any value of $d = d_m$ has an equal probability of falling between the values $d_a$ and $d_b$ that enclose the sub-areas. These equal areas or equal probabilities have been labeled in ascending order from 00000 to 99999. By this arrangement, for any given value $d_m$ the integral from $-\infty$ to $d_m$ can be calculated and the corresponding memory address is given by the first five decimal digits of the integral, disregarding the others.

In Equation 12 utilizing the values of $t$ from Table II, there was calculated a value $d_m = 2.07$. The memory address or section corresponding to this example is $$\frac{1}{\sqrt{2\pi}}\int_{-\infty}^{2.07} exp\left(\frac{-x^2}{2}\right)dx = 0.98077 \qquad (17)$$

This means that the card 10 bearing the identifier 11 of FIG. 1 is to be stored in memory section number 98077.

A significant feature regarding the treatment of the information concerning the distribution of the respective alpha-numeric characters may be noted from a consideration of the way in which a particular section address is derived. Equation 12 relates the standard deviation of the arithmetic mean to the number of identifier positions $n$ and the corresponding values of $t$. Clearly, however, this derivation of $d_m$ is adaptable to identifiers having different numbers of positions with different values of $t$. In similar fashion, the system may be adapted to provide section addresses for memories of varying sizes. For example, the memory may easily be divided into 10,000 or 1,000 separate sections in which case the section addresses relate to the first four digits or the first three digits, respectively, of the integral of Equation 17. In a memory of 1,000 sections, for example, any item identifier having a corresponding $d_m = 2.07$ would be provided with a corresponding memory address of 980. Thus the method of the invention is readily adaptable to varying situations and equipment with whatever degree of accuracy may be desired.

Figure 7:
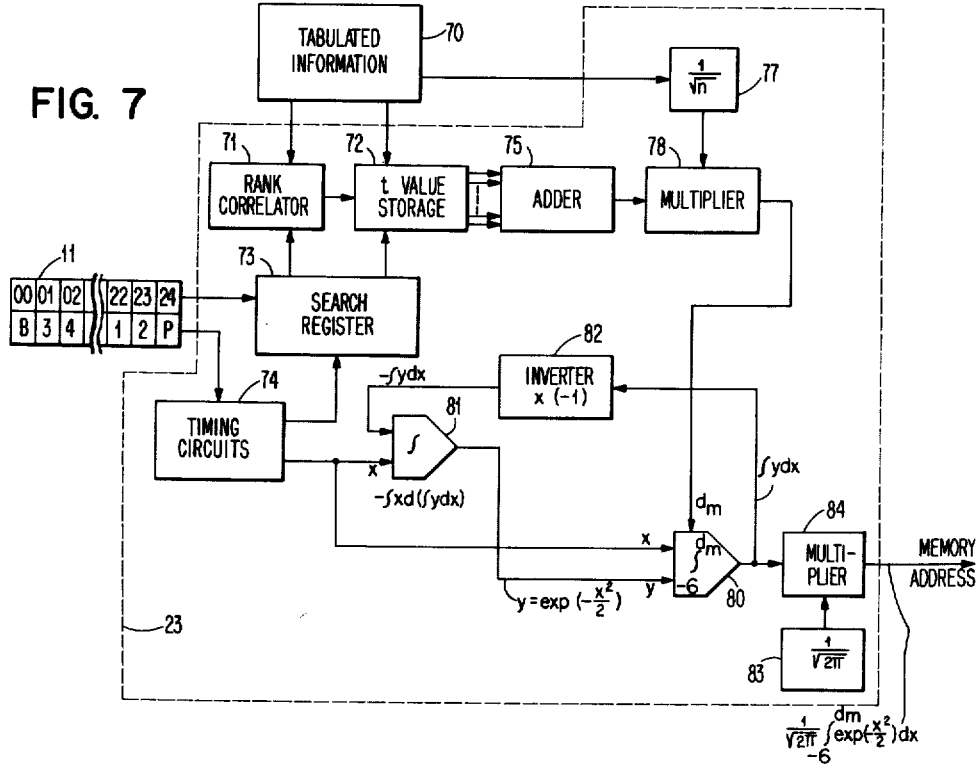
FIG. 7 is a block diagram depicting in greater detail a portion of the system of FIG. 2.

FIG. 7 represents in block diagram form an arrangement of a memory address generator in accordance with the invention. The portion enclosed by the dashed line corresponds to the memory address generator 23 of FIG. 2. In FIG. 7 the tabulated information 70 is presented to a rank correlator 71, a function generator 77, and a $t$ value storage unit 72 so that these stages may be set in accordance with the frequency distribution of the particular tabulated information as described above. When a particular memory address is to be generated, an item identifier 11 is applied to the memory address generator 23 where it is stored in a search register 73 and is also applied to the timing circuits 74 to initiate operation of the memory address generator.

Thereafter the indexing operation begins. The contents of the search register 73 are read out serially by character and applied to the $t$ value storage unit 72 and also to the rank correlator 71 which sends a signal representing a corresponding assigned rank to the $t$ value storage unit 72. Thus, there is present in the $t$ value storage unit 72 simultaneously information with respect to the identification of a particular character and its corresponding rank as established by the frequency distributions of the tabulated information 70. As the contents of the search register 73 are read out, the output of the $t$ value storage unit 72 is applied to an adder stage 74 which provides a summation of all the respective $t$ values corresponding to the particular alpha-numeric characters making up the item identifier 11. The summation output from the adder 75 is then applied as an input signal to the multiplier 78 for multiplication by the function $$\frac{1}{\sqrt{n}}$$

supplied by the stage 77 which was previously set in accordance with the tabulated information 70. The output of the multiplier stage 78 then corresponds to the standard deviation of the mean of the respective $t$ values as developed in Equation 12 above, and is applied as a control for an integrating amplifier 80 in order to serve as the upper limit of the integrating function of Equation 17.

As has been described above, the area under the Gaussian curve is integrated from $-\infty$ to the calculated value $d_m$ with an accuracy to five decimal places (where a memory address of five digits is desired). The lower limit of this integration, i.e., $-\infty$, is not practically available as a voltage value. In this case, a value of $-6$ volts is selected as the lower limit of integration and is quite adequate, since any table of the Gaussian curve will reveal that $$\frac{1}{\sqrt{2\pi}}\int_{-\infty}^{-6} exp\left(\frac{-x^2}{2}\right)dx = 0.0000000 \ldots$$

Thus it can be seen that the integration from a value of $-6$ is undiscernible from the integration from a value of $-\infty$, insofar as the present situation is concerned.

In addition to controlling the readout of information from the search register 73, the timing circuits 74 supply a variable of integration for the integrating amplifiers 80 and 81, which variable is designated $x$ in FIG. 7. A function $$y = exp\left(\frac{-x^2}{2}\right)$$

is supplied as a second input to the integrating amplifier 80. The output of this amplifier then, which is $\int y dx$, is directed to a multiplying stage 84 and is also fed back through an inverter 82 which supplies the multiplication by $-1$ to become the second input to the integrating amplifier 81. In the stage 81 an integration is performed corresponding to $-\int x d(\int y dx)$, so that the output of the stage 81 becomes equal to $$y = exp\left(\frac{-x^2}{2}\right)$$

A stage 83 supplies a constant signal corresponding to the value $$\frac{1}{\sqrt{2\pi}}$$

which is applied to the multiplying stage 84 to control the multiplication of the input to the stage 84 by $$\frac{1}{\sqrt{2\pi}}$$

Thus, the function $\int y dx$, which is in reality $$\int_{-6}^{d_m} exp\left(\frac{-x^2}{2}\right)dx$$

is multiplied by $$\frac{1}{\sqrt{2\pi}}$$

in the stage 84 to become a voltage value at the output thereof corresponding to the desired memory address.

It will be understood that the rank correlator 71, the function generator 77 and the $t$ value storage unit 72 of FIG. 7 may be arranged to operate automatically in response to the tabulated information 70 which is fed into the memory address generator 23 so as to order the alpha-numeric characters, determine $$\frac{1}{\sqrt{n}}$$

and set the $t$ values in accordance with the frequency distribution of the information. More commonly, however, the tabulated information will be statistically analyzed by the customer before it is presented for storage in the computer memory, so that the rank correlation, the number of identifier positions, and the corresponding $t$ values relating to the frequency distribution of the information are established by the customer. In such a case, the rank correlator 71, the generator 77, and the $t$ value storage unit 72 are arranged to be adjustable so that they may be set to the appropriate values by the customer.

Figure 8:
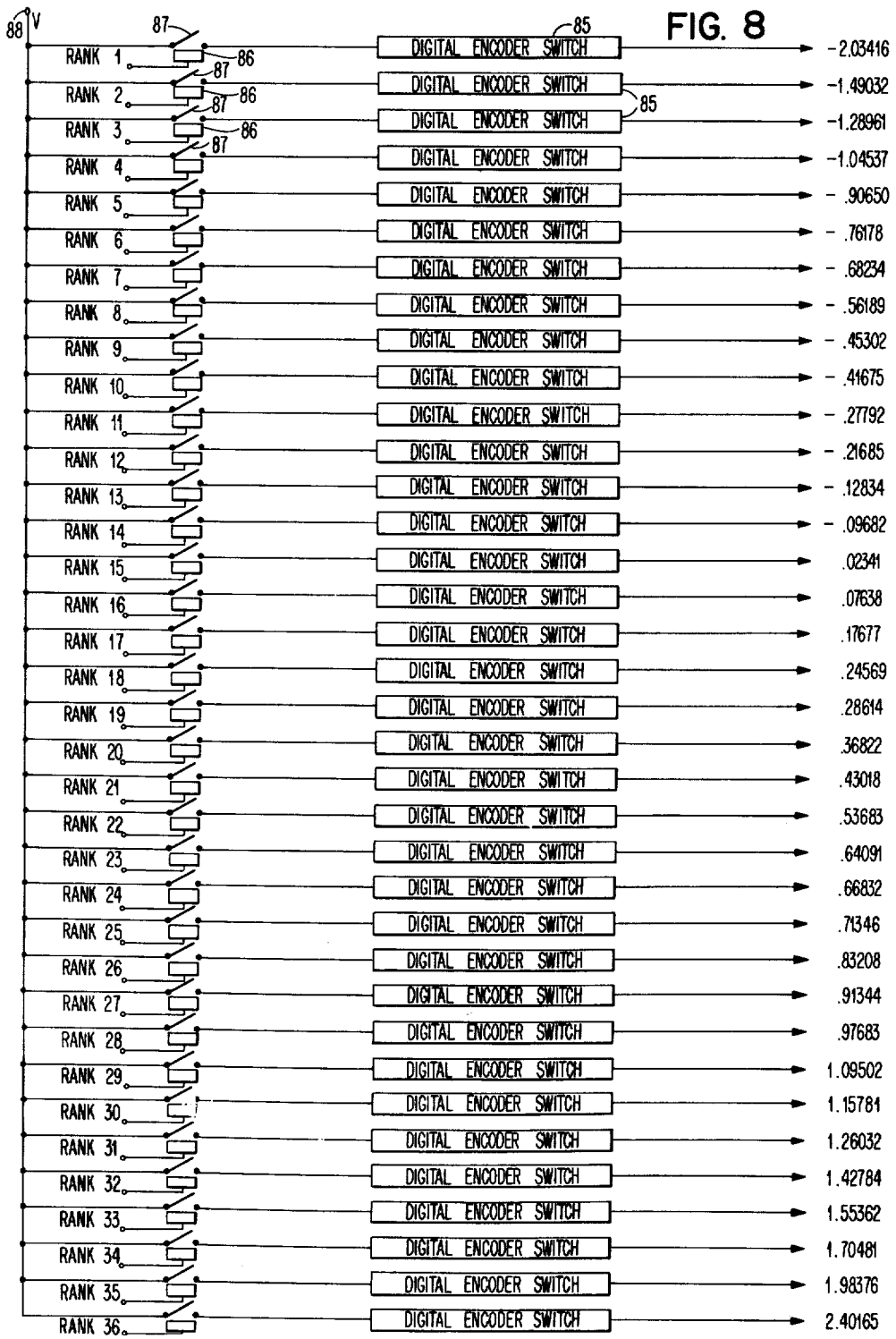
FIG. 8 is a schematic diagram representing a portion of the structure of the invention as depicted in the block diagram of FIG. 7.

FIG. 8 represents schematically one specific arrangement for the $t$ value storage unit 72 which is arranged to be adjustable in accordance with settings selected by an operator. In FIG. 8 a plurality of digital encoder switches 85 are shown connected between a terminal 88 and a plurality of output leads. Each of the digital encoder switches 85 is connected in series with an individually associated switch 87, represented as a pair of relay contacts controllable by a solenoid 86. Each switch 87 is given a particular rank designation from 1 to 36. In operation each digital encoder switch 85 is set in accordance with the appropriate $t$ value for the corresponding rank as determined from the tabulated information. Thus, whenever the solenoid 86 for a particular rank is energized the associated switch 87 closes and presents at the output of the circuit of FIG. 8 a coded electrical signal which corresponds to the $t$ value setting of the associated encoder switch 85. The numbers at the right hand side of FIG. 8 represent a typical set of $t$ values which may be developed by this arrangement.

FIG. 9 depicts an arrangement for use in the rank correlator 71 of FIG. 7 by which an operator may designate the rank of the respective alpha-numeric characters. In FIG. 9 a plug board 91 is shown having a plurality of opposed terminals 92 and 93. The terminals 92 are designated with the respective alpha-numeric characters available for use in the item identifiers, while the terminals 93 are designated by a rank number from 1 to 36. A separate plug board 91 is provided for each position of the item identifier so that the rank correlation for each identifier position may be readily changed by the operator, simply by the substitution of a different plug board. The plug board 91 is wired by the operator by providing the proper connection between the appropriate pairs of the opposed sets of terminals 92 and 93 in accordance with the frequency distribution of the tabulated information. Thus in the arrangement shown in FIG. 7 when the search register 73 energizes a particular alpha-numeric character terminal 92 in accordance with the alpha-numeric character occurring in the particular identifier position being read out, the associated rank terminal 93 is thereupon energized. As a result, circuit connections (not shown) energize the corresponding solenoid 86 of the circuit of FIG. 8 so as to pass to the adder 75 a signal corresponding to the alpha-numeric character under consideration. For example, if in FIG. 9 the terminal 92 designated H is energized, a voltage is passed to the terminal 93 representing the rank 4. From the rank 4 terminal the voltage is directed to the solenoid 86 of FIG. 8 corresponding to rank 4, thus causing it to operate the associated switch 87 and apply to the output of the circuit of FIG. 8 a coded signal having a numerical value determined by the setting of the appropriate digital encoder switch 85. In the example given, this signal corresponds to the $t$ value of $-1.04537$.

The adder 75, multipliers 78 and 84 and the integrating amplifiers 80 and 81 in FIG. 7 may advantageously comprise digital differential analyzer circuits such as are known in the art. Following digital differential analyzer techniques, analog methods are used in digital fashion and it is possible to achieve five-digit accuracy in such operations. Thus, the use of digital differential analyzers in the generation of the normal cumulative distribution function and the integration over the Gaussian curve materially simplifies the structure needed to attain the desired precision while augmenting the performance of the system of the invention. An additional advantage accrues from the fact that digital differential analyzers provide an output signal in digital form, thus eliminating the need for an analog-to-digital converter which would otherwise be needed if the memory address were generated by means of analog operational amplifiers. A particular type of digital differential analyzer circuit which may be employed in the above-mentioned stages is described in a publication entitled "The Design of the Bendix Digital Differential Analyzer," by M. Palevsky, appearing in The Proceedings of the IRE, October 1953, pages 1352 ff. The search register 73 and the timing circuits stage 74 comprise circuitry which is well known to those skilled in the art. It is therefore considered unnecessary to furnish the details of the circuits here.

In the arrangement of the invention depicted in FIG. 7, it is implied that the memory address generator system will be operated in accordance with the description of the transformation process set forth above. By this, it is meant that a standardized cumulative distribution curve for each of the different identifier positions is obtained, so that in general the rank correlator 71 must supply correlation with thirty-six ranks for each of twenty-five identifier positions; and in addition the $t$ value storage unit 72 must have provision for $25 \times 36 = 900$ different ways for the operator to set the $t$ values for a particular identifier set. While this is rigorous from a purely mathematical point of view, it is possible to depart slightly from pure theory in order to provide a somewhat more practical system. As a suitable compromise, the number of curves which are depended upon to provide the settings of the rank correlator 71, the generator 77, and the $t$ value storage unit 72 may be substantially reduced. For example, if it is desired to use three curves, instead of twenty-five, each one of the three may be a composite which is derived from particular ones of the twenty-five identifier position curves. A composite curve is prepared by taking the averages of the midpoint cumulative frequencies corresponding to respective ranks. Thus, for example, suppose that identifier positions 00 through 09 are to be combined in one composite curve from the statistical tables prepared in the manner illustrated in connection with Table I. All of the midpoint cumulative frequencies corresponding to rank 1 for the positions 00 through 09 are added and the result is divided by 10 to arrive at an average midpoint cumulative frequency for rank 1. The same thing is done for rank 2 and so on through all of the ranks in the table. These averaged values are then used as the basis for locating a corresponding value of $t$ from a statistical table of cumulative distribution function. Similar operations are performed in connection with the remaining identifier positions in order to derive the remaining composite curves. The composite curves thus derived are then combined in accordance with the principles of the Addition Theorem, as described above in the development of Equation 12, to arrive at the desired value of standard deviation, $d_m$. The advantage of performing this process to derive the composite curves is that the number of $t$ values needed for the value storage unit 72 is materially reduced without significant sacrifice in the accuracy obtainable in the practice of the invention.

In the circuits set forth in FIG. 8, the digital encoding switches 85, from which the corresponding $t$ values are derived, have been shown in a rudimentary form in order to simplify the understanding of the arrangement. To provide the requisite accuracy of the various $t$ values to five or six decimal places, each digital encoding switch 85 may comprise a plurality of decade switches as shown in FIG. 10.

Figure 10:
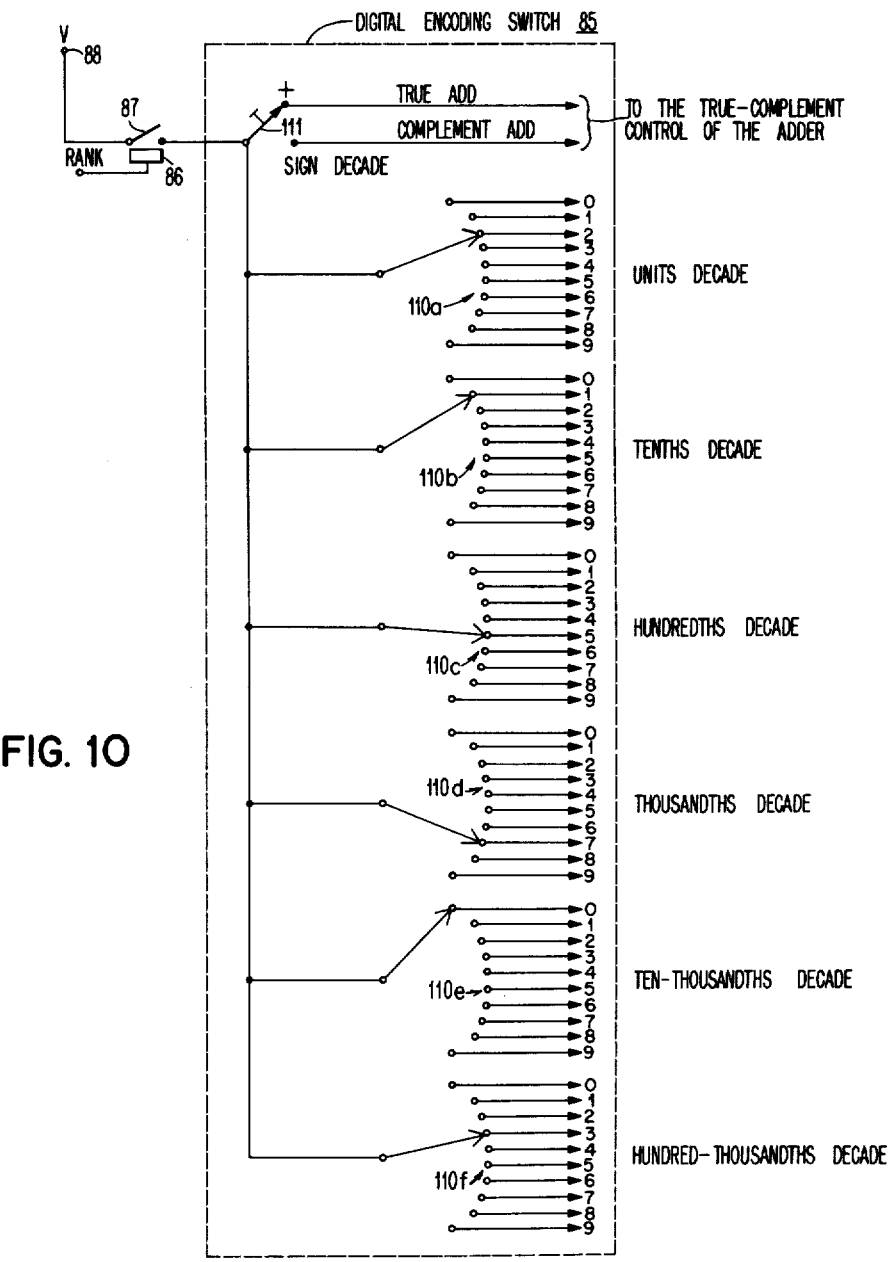
FIG. 10 is a schematic representation of an arrangement which may be employed in the circuit of FIG. 8.

In FIG. 10 a single digital encoder switch 85 is shown comprising a plurality of decade switches 110a–110f, each comprising a ten-position switch which functions to connect the input terminal 88 to a selected one of ten output leads for each decade switch whenever the solenoid 86 associated therewith closes the contacts 87. Each of the decade switches 110a–110f corresponds to a significant digit of a multiple digit number so that the appearance of signals on selected ones of the output leads provides a coded electrical signal having a numerical value determined by the settings of the digital encoder switches 110a–110f. Thus, by setting the digital encoder switches 110a–110f to a selected $t$ value, coded electrical signals are generated corresponding thereto. Since the desired $t$ values may be either positive or negative, the digital encoder switch 85 may also include a single pole double throw switch 11 which selectively provides an output signal on either a "true add" lead or a "complement add" lead for application to the adder 75 of FIG. 7. By this means, the adder 75 functions to perform a suitable condition or subtraction function as indicated by a positive or negative $t$ value. Thus, by appropriately establishing the positions of the respective switches 110$a$–110$f$ and 111, an operator may develop at the output of each digital encoding switch 85 a coded electrical signal which corresponds to the selected $t$ value with an accuracy to six decimal places and having either a positive or negative value. Additional switches may be included in the manner illustrated if greater precision is desired.

One way in which the memory address generator 23 of FIG. 2 may be rendered readily adaptable to information from various sources in accordance with the invention is by the inclusion therein of a control panel to which the separately wired plugboards, such as plugboard 91 shown in FIG. 9, may be connected. FIG. 11 illustrates a portion of such a control panel 114 having forty connecting terminals or hubs 115 in each row thereof. As employed in the memory address generator 23, the control panel 114 is arranged to provide a set of seventy-two hubs for each identifier position. Each set of seventy-two hubs comprises two rows of thirty-six hubs each. The first row corresponds to the character terminals 92 of FIG. 9, while the second row corresponds to the rank terminals 93 thereof. Thus, for example, in the two bottom rows of FIG. 11, which may be considered to correspond to the identifier position 24, the upper row is designated by respective alpha-numeric characters while the lower row is designated by rank numbers from 1 to 36. A particular plugboard, such as the board 91 represented in FIG. 9, may be inserted into the hubs 115 of the control panel 114 of FIG. 11 so that the correspondence between particular character and rank for a given identifier position may be supplied to the memory address generator 23 as desired. A separate plugboard 91 may be provided for each double row of hubs 115 in the control panel 114.

A particular arrangement of the search register 73 of FIG. 7 will now be described in order to clarify the operation thereof. This is represented in block diagram form in FIG. 12 as comprising a primary register 121 controlled by a core character ring 122 which in turn receives signals from the timing circuits 74. The primary register 121 is connected to a core character register 124 which in turn is connected to the input of an alpha-numeric decoder 125. The core character ring 122 is connected to a core character ring decoder 123 which, together with an alpha-numeric decoder 125 connected to the core character register 124, supplies an input to a control panel output decoder 126. The various blocks comprising the search register 73 of FIG. 12 will be described in greater detail in connection with the schematic representations of FIGS. 13–15.

Figure 13:
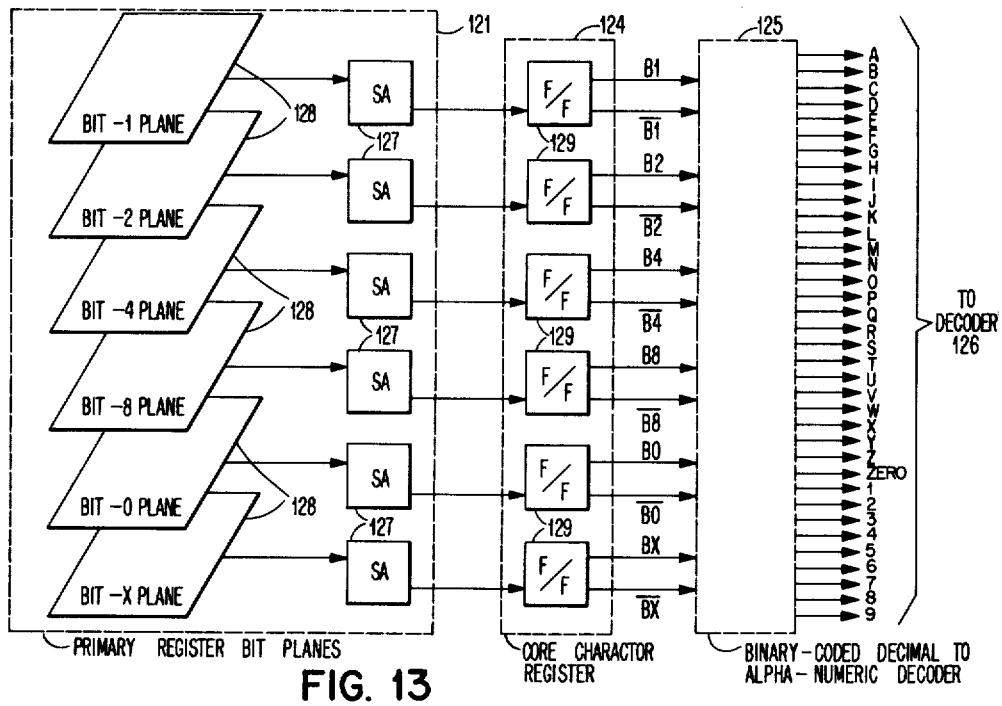
FIG. 13 is a schematic representation of one segment of the block diagram of FIG. 12.

In FIG. 13 which depicts primary register 121, the core character register 124 and the alpha-numeric decoder 125 of FIG. 12, the particular identifier may be considered to be stored within the primary register 121. The register 121 may comprise a twenty-five-digit magnetic core buffer represented by the bit planes such as the planes 128. Once the storage of a particular identifier within the primary register 121 is completed, the indexing operation may begin. The contents of the primary register 121 are read out serially by character, but parallel by bit under the control of the core character ring 122 which is driven by the timing circuits 74. Sense amplifiers 127 direct the information from the primary register bit planes 128 to corresponding flip-flops 129 within the core character register 124. The output states of the respective flip-flops 129 are applied to the alpha-numeric decoder 125 to select a particular one of the thirty-six output leads thereof corresponding to the character under consideration. The energized output lead of the alpha-numeric decoder 125 thus supplies a character designation to the control panel output decoder 126.

Figure 14:
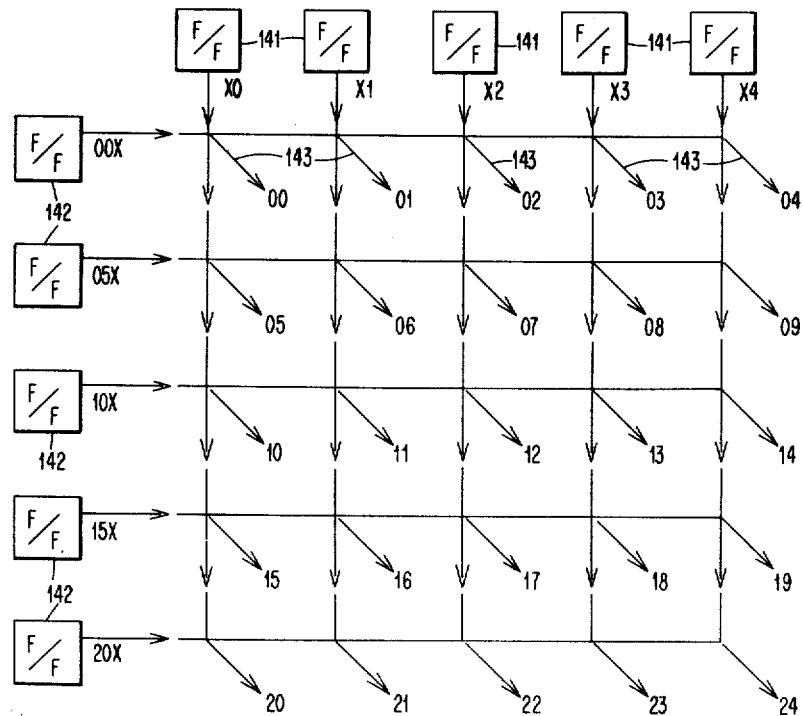
FIG. 14 is a schematic representation of a second segment of the block diagram of FIG. 12.

Meanwhile the core character ring decoder 123 represented as a matrix under the control of individual flip-flop stages 141 and 142 in FIG. 14, is sequentially energized by the timing circuits 74. The flip-flop stages 141 and 142 cooperate to provide an output signal on each of the twenty-five output leads 143 in succession. A particular energized lead 143 corresponds to the particular identifier position containing the character that is being read out of the primary register 121 of FIG. 12 and applied as the alpha-numeric input to the control panel output decoder 126. The output of the core character ring decoder 123 is applied as a second input to the control panel output decoder 126.

Figure 15:
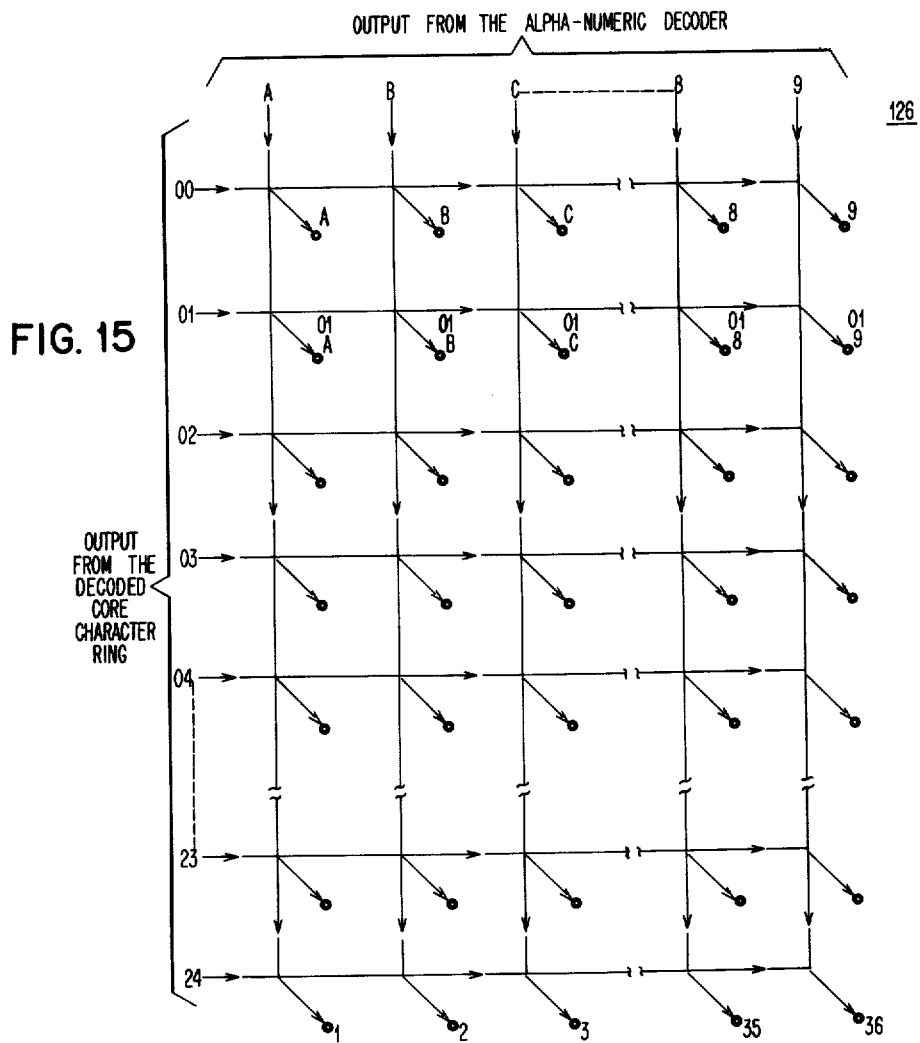
FIG. 15 is a schematic representation of a third segment of the block diagram of FIG. 12.

Within the control panel output decoder 126 represented in FIG. 15, the respective leads from the alpha-numeric decoder 125 and the core character ring decoder 122 are combined in a matrix of corresponding columns and rows to select a given character designation within a particular identifier position. By this means an energizing voltage is applied to an appropriate hub 115 of the control panel 114 of FIG. 11. A resulting digital voltage representing the corresponding normal deviate or $t$ value is thus developed for application to the adder 75 as previously described above in connection with FIG. 7. Thus the control panel output decoder 126 may be thought of as a circuit for selecting particular data (specifically the normal deviate or $t$ values) corresponding to the designated identifier position and alpha-numeric character.

When applying the Addition Theorem, in the manner set forth in Equation 12 above, the number $n$ (in this example, 25) must be a constant throughout the entire identifier set. It is with this understanding that the system of FIG. 7 is described, wherein the function generator 77 for providing the constant multiplier $$\frac{1}{\sqrt{n}}$$

is maintained at the setting which is initially established in accordance with the tabulated information 70.

It is often the case, however, that certain identifier sets will contain identifiers which have one or more blank identifier positions. It can be seen that the processing of such identifiers, in combination with other identifiers having all positions occupied, by the system of FIG. 7 will result in a distortion of the addition and multiplication processes carried out by the adder 75 and the multiplier 78 so that the appropriate memory address may not be generated. Accordingly, the arrangement of FIG. 16 has been developed in accordance with the invention to take care of this problem in the arrangement of FIG. 7.

Figure 16:
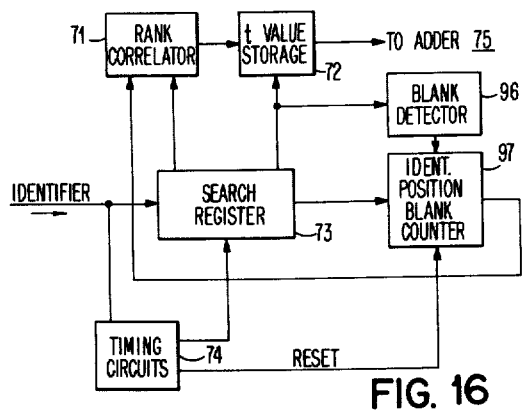
FIG. 16 is a block diagram embodying a modification of the arrangement depicted in FIG. 7.

In the arrangement of FIG. 16, the occurrence of a blank in any position in a given identifier is detected and each blank is thereupon replaced by a character from the same identifier, beginning with the character for the position 00 and continuing with the characters from succeeding positions so long as additional blanks are detected. By this procedure all of the identifiers always have the same number of characters so that the distortion in the final memory address, which might otherwise arise, is eliminated.

In FIG. 16 those stages of the arrangement of FIG. 7 which are pertinent to a discussion of this portion of the invention are repeated. These are the rank correlator 71, the $t$ value storage stage 72, the search register 73 and the timing circuits 74. Also in FIG. 16, a blank detector 96 and an identifier position blank counter 97 are shown. The counter 97 is always started at position 00. When a blank is detected by the blank detector 96 during the readout of an identifier from the search register 73, the identifier position blank counter 97 is triggered so that it permits the character in position 00 to be directed to the rank correlator 71. At the same time, it advances its counting state to the next position 01 so that upon the detection of another blank by the detector 96, the character of position 01 will be substituted. This procedure continues until the entire identifier has been read out of the search register 73, at which time the timing circuit 74 applies a reset pulse to the counter 97 so that it starts over with position 00 of the next identifier.

Figure 17:
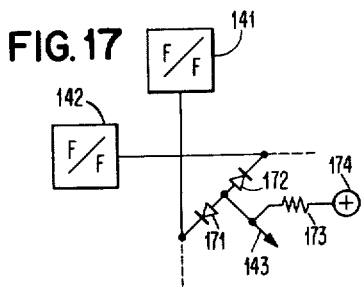
FIG. 17 is a more detailed schematic representation of portions of FIGS. 14 and 15.

FIG. 17 depicts one particular output circuit arrangement which may be employed at the respective matrix intersections in FIGS. 14 and 15. One particular output circuit is shown as it would appear in FIG. 14 with a vertical lead connected to a column flip-flop 141 and a horizontal lead connected to a row flip-flop 142. At each intersection of the matrix there may be connected an AND circuit as shown in FIG. 17 including the reversely poled diodes 171 and 172 to which the output lead 143 is connected at the common connection of the diodes 171, 172. The circuit is completed by the connection of a resistor 173 between the common connection and a biasing potential source 174. The output lead 143 is maintained at a low potential so long as either flip-flop 141 or 142 is in the inactive state. When both flip-flops 141, 142 are rendered active so as to selected the associated AND circuit, the diodes 171, 172 become back-biased and a positive signal is developed over output lead 143 by virtue of the biasing source 174. Although the circuit of FIG. 17 is shown and described in terms of its application to the matrix arrangement of FIG. 14, it may also be employed in FIG. 15. Other matrix arrangements as are known may also be employed for the purpose described.

There have been described herein methods and apparatus for automatically processing a plurality of information items to permit efficient assignment within a storage memory in accordance with the invention for the purpose of illustrating the manner in which the invention may be used to advantage.

While the invention has been particularly shown and described with reference to preferred embodiments thereof, it will be understood by those skilled in the art that various changes in form and details may be made therein without departing from the spirit and scope of the invention.

What is claimed is:

1. A system for automatically storing information which is individually designated by specific coded identifiers comprising a memory unit having a plurality of discrete sections therein each bearing an indivdual memory address, a plurality of information items having individual identifiers, a memory address generator for producing a particular memory address corresponding to an individual item identifier in accordance with the statistical distribution of the identifier characters within the plurality of information items to be stored in the memory unit, means for applying an individual item identifier to the memory address generator, translating means for passing information from a particular information item to the corresponding memory unit section bearing the address provided by the memory address generator, and means for retrieving the information thus stored by applying a given coded identifier to the memory address generator and reading out the corresponding information from the particular memory unit section designated by the address provided by the memory address generator.

2. An information storage system for storing a plurality of information items in specified sections of a memory unit with a minimum of overflow from individual sections thereof comprising a plurality of information items each having an individual identifier comprising a number of alpha-numeric characters, means for determining the statistical distribution of the identifiers of said plurality for the respective identifier positions, a memory address generator, means for storing in the memory address generator statistical parameters related to the distribution of the identifiers, a memory unit having a plurality of discrete storage sections therein, each storage section being designated by a unique address, transducing means associated with the memory unit for selecting the particular storage section in accordance with an address provided by said memory address generator and for storing information in and reading information out of the selected storage section in response to appropriate control signals, means for applying the identifier from a specific information item to the memory address generator in order to develop a corresponding storage section address, said address being determined in accordance with the statistical parameters stored in the memory address generator so as to bear an equal probability of occupany for each storage section, means for applying the information from a particular information item to the transducing means for storage in the designated storage section, and retrieval means including means for applying a specific identifier to the memory address generator so as to designate the particular storage section containing the information corresponding to the specific identifier in order that the information may be retrieved therefrom.

3. The method of storing and retrieving information from designated sections in a memory unit with a minimum of overflow from individual sections comprising the steps of applying an item identifier which uniquely identifies information to be stored in the memory unit, generating a section address corresponding to the identifier and which is related thereto in accordance with the statistical distribution of identifier characters within a plurality of information items which are to be stored, selecting the particular memory section which is designated by the generated address, and applying the information from the particular information item corresponding to the applied identifier for storage in the selected memory section.

4. The method in accordance with claim 3 which further comprises the steps of applying a particular identifier to the memory address generator, generating an address corresponding to the applied identifier in order to designate the particular section wherein the information corresponding to the identifier is stored, selecting said particular section in response to the generated address, and reading the stored information out of the particular section.

5. Apparatus for storing information in accordance with a pattern related to the frequency distribution of the information comprising a plurality of information bearing items, means for sorting the items in accordance with the information borne thereon, a tabulator for indicating the frequency of occurrence of the information bearing items in their respective categories, means responsive to the tabulated information for storing statistical data in the form of a uniform probability function which is related to the actual frequency of occurrence of the information bearing items in their respective categories, and means for assigning a particular memory address for a given information item in accordance with the related uniform probability function.

6. Apparatus for storing information in a computer memory having discrete sections, each bearing a unique memory address, comprising a plurality of information bearing items, a sorter for categorizing the items in accordance with the information contained therein, a tabulator for counting the number of items in each of the respective categories, means for generating a memory address for any individual item in accordance with the tabulator count so that each section of the memory has an equal probability of being filled, and means for storing and retrieving an individual information item within the memory in accordance with its generated memory address.

7. Apparatus for minimizing the overflow from particular sections of the compartmentalized memory of a computer comprising a plurality of information bearing items, counting means for determining the number of such items in a group having a particular bit of information thereon, memory address generating means responsive to the count of the like information bearing items for generating memory addresses for individual ones of said items so that all sections of the memory have an equal probability of being filled, and means for storing and retrieving individual information bearing items in the memory in accordance with the generated memory addresses.

8. Apparatus for classfying a plurality of discrete items in a number of classes so that each class has an equal probability of being filled comprising a plurality of discrete items each individually identifiable by an arrangement of a number of identifying characters, means for segregating and tabulating the items in accordance with their commonly shared characters, means for arranging the segregated items in a particular order related to the frequency of occurrence of respective commonly shared characteristics, means for relating the occurrence of an individual identifier to a standardized cumulative distribution function statistically derived from the frequency distribution of the respective items, and means for providing a designation of a particular item in accordance with its position in the corresponding normal distribution of the items so that its class has an equal probability with all other classes of being filled.

9. Apparatus for automatically generating a memory address related to an individual item identifier in accordance with the statistical distribution of a given set of item identifiers comprising a rank correlator for according a rank to each character in the set of identifiers, storage means for providing normal deviate values related to the statistical distribution of the characters in the set of identifiers in response to rank designations from the rank correlator, means coupled to the storage means for adding the normal deviate values corresponding to the separate characters of a particular identifier, means connected to the adding means for multiplying the output of the adding means by a selected constant in order to derive the standard deviation of the arithmetic mean of the selected normal deviates, and means coupled to the multiplier for generating a memory address for the particular identifier in accordance with the derived standard deviation of the arithmetic mean so that each discrete portion of the memory has an equal probability of being occupied by items from the specified set.

10. Apparatus for automatically indexing a plurality of item identifiers, each having a specified number of positions which may be occupied by selected alpha-numeric characters, comprising means for storing a set of normal deviate values related to the statistical distribution of characters in the plurality of identifiers, means coupled to the storing means for correlating an individual alpha-numeric character with a rank corresponding to its frequency of occurrence over the plurality of item identifiers, means for causing the rank correlating means to select a normal deviate value corresponding to each alpha-numeric character in a given item identifier, means connected to the output of the storing means for adding the respective normal deviate values related to a specific item identifier, means coupled to the adding means for multiplying the resulting sum by a constant related to the number of positions contained in the item identifier, and means for generating a memory address substantially in accordance with the standardized cumulative distribution function integrated to a limit equal to the value which is developed at the output of the multiplying means.

11. Apparatus for automatically indexing a plurality of item identifiers, each having a number of positions which may be occupied by selected ones of a set of alpha-numeric characters or which may be blank, first means for detecting the occurrence of characters within a particular item identifier, means coupled to the first means for selecting a normal deviate value derived from the statistical distribution of the plurality of item identifiers in accordance with the particular character being detected, second means coupled to the first means for detecting an item identifier having a blank position therein, means coupled to the second means for selecting an alpha-numeric character from another position in the identifier upon the detection of a blank position and directing the selected character to the normal deviate selecting means, means for adding the normal deviate values corresponding to the individual characters of the item identifier, means connected to the adding means for multiplying the resultant sum by the reciprocal of the square root of the number of identifier positions, and means coupled to the multiplying means for integrating in accordance with the standardized cumulative distribution function from a lower limit providing a value of the integral substantially equal to zero to an upper limit corresponding to the product of said multiplication in order to provide an index corresponding to the particular item identifier which is related to the statistical distribution of item identifier characters.

12. A memory storage system for effecting the storage of information in discrete memory unit sections with a minimum of overflow from individual sections comprising a memory unit having a plurality of discrete sections, each bearing a unique memory address, a plurality of information items to be stored in the memory each having a unique item identifier composed of alpha-numeric characters, means for determining the statistical distribution of alpha-numeric characters for the identifiers of a plurality of information items, a memory address generator including means for developing a particular memory address for an individual identifier in accordance with the predetermined statistical distribution of the plurality of information items, translating means for applying an individual identifier to the memory address generator and for applying the information from the corresponding information item to the memory unit for storage in a particular section designated by said particular memory address, means for selecting a particular memory section in response to said generated address, means for recognizing an available storage space within said selected section and for causing the translating means to present the information for storage therein upon the occurrence of said recognition, and means for retrieving stored information from said memory unit.

13. Apparatus for retrieving information from a memory unit, said information having been stored therein in accordance with the statistical distribution of corresponding information item identifiers in order to provide equal probabilities of occupancy for all the discrete areas of the memory unit comprising a memory unit having a plurality of sections each having a unique section address, a memory address generator for providing a section address corresponding to a particular item identifier and related to the statistical distribution of item identifiers within a set of information items, means for applying a particular item identifier to the memory address generator, means responsive to the corresponding address for selecting the particular section designated thereby, means for matching the applied identifier with particular signals stored in said selected section, and means for reading out the information accompanying said signals upon the occurrence of a match at said matching means.

14. Automatic indexing apparatus for assigning an index to a particular item identifier so that each one of a plurality of possible indices has an equal probability of being assigned to a given identifier comprising a set of item identifiers, each having a plurality of positions in which selected alpha-numeric characters may occur, means for examining each position in a particular item identifier to determine the character appearing therein, means adjustable in accordance with the statistical distribution of alpha-numeric characters in the respective positions of the item identifiers over the entire set of identifiers, means coupling the adjustable means to the examining means in order to develop normal deviate values related to the particular characters occurring in the item identifier being examined, adding means coupled to the adjustable means for producing a sum of the normal deviate values related to said item identifier, first multiplying means coupled to the adding means for multiplying said sum by the reciprocal of the square root of the number of positions in said item identifier to provide an output designated $d_m$, means for integrating in accordance with the function $$\int_{-6}^{d_m} exp\left(\frac{-x^2}{2}\right)dx$$

and second multiplying means for multiplying the result of said integration by $$\frac{1}{\sqrt{2\pi}}$$

to develop the index corresponding to the particular item identifier being examined.

15. Automatic indexing apparatus in accordance with claim 14 wherein certain item identifiers may have blank identifier positions, and further including means coupled to the examining means for detecting the appearance of a blank identifier position and means responsive to the blank detecting means for selecting an alpha-numeric character from another position in the identifier upon the detection of a blank position in order to maintain the same number of selected normal deviate values applied to the adding means for all item identifiers in the given set.

16. The method of automatically indexing a plurality of information bearing items in accordance with the statistical distribution of a set of information items comprising the steps of determining the relative frequency of occurrence of each character in the identifiers, establishing a particular order of the respective characters in accordance with their relative frequencies of occurrence, determining the normal deviate values for each relative frequency of occurrence by order of rank, combining the normal deviate values for corresponding ranks for the different identifier positions in a single item identifier to determine the standard deviation of the related normal deviate values, and employing the standard deviation value to determine the memory address to which the item identifier corresponds.

17. The method of automatically indexing a plurality of information items, each bearing an item identifier having a plurality of distinct characters, comprising the steps of establishing a standardized cumulative distribution function for each identifier position in accordance with the statistical distribution of the information items to be stored, selecting a normal deviate value for each character in an item identifier according to its position in the standardized cumulative distribution function corresponding to the identifier position for that character, combining the normal deviate values for the respective characters in the particular item identifier in order to determine an over-all standard deviation for the particular item identifier, and integrating from $-\infty$ to the standard deviation so obtained in accordance with the equation $$\frac{1}{\sqrt{2\pi}}\int_{-\infty}^{d_m} exp\left(\frac{-x^2}{2}\right)dx$$

where $d_m$ is the over-all standard deviation and $x$ is a random variable, in order to generate an index having an equal probability with all available indices corresponding to the item identifier.

18. A method of storing information from a particular information item of a plurality of items, each having a unique item identifier, in a memory unit having a plurality of discrete storage sections, each designated by a unique address, comprising the steps of determining the statistical distribution of the identifiers for the plurality of information items to be stored, establishing the normal deviates for the identifier characters from the determined statistical distribution, selecting a particular item to be stored in the memory unit, generating a storage section address corresponding to the identifier of the particular item by utilizing selected ones of the normal deviates in accordance with the function $$\frac{1}{\sqrt{2\pi}}\int_{-6}^{d_m} exp\left(\frac{-x^2}{2}\right)dx$$

where $x$ is a variable of integration, and $d_m$ is equal to the standard deviation of the arithmetic mean of the normal deviate values, selecting the particular storage section designated by the generated address, and storing the information from the particular information item in the selected storage section.

19. Apparatus for storing information in a memory unit with a minimum of overflow from discrete sections thereof comprising a memory unit having a plurality of discrete sections for information storage, each section having a unique address, a plurality of information item each bearing a unique identifier comprising a plurality of code characters, means for statistically analyzing the distribution of code characters in respective identifier positions for a plurality of items to be stored, data storage means for storing normal deviate values related to said statistical analysis, means for generating a section address corresponding to a particular item identifier in accordance with the mathematical expression $$\frac{1}{\sqrt{2\pi}}\int_{-6}^{d_m} exp\left(\frac{-x^2}{2}\right)dx$$

where $x$ is a variable of integration and $d_m$ represents the standard deviation of the arithmetic mean of said stored normal deviate values, means for selecting the particular section designated by the generated address, and means for storing in the selected memory section the information associated with the particular identifier.

20. Apparatus in accordance with claim 19 further comprising information retrieval means including means for selecting an identifier corresponding to information previously stored in the memory in order to generate the corresponding unique section address in accordance with said mathematical expression, the section selecting means being responsive to the generated address so as to select the particular section where said information is stored, means for comparing the selected identifier with signals obtained from the selected memory section, and means for reading out the information stored in said section which corresponds to the selected identifier when a match is detected between the selected identifier and said signals.

21. Apparatus for automatically indexing a plurality of information items to be stored in a computer memory in accordance with the statistical distribution of the population of information items comprising precision voltage generating means which may be set in accordance with the normal deviates of the standardized cumulative distributions of the particular characters in different positions of the item identifiers, means for selecting a particular voltage generating means corresponding to the character of an identifier being examined, means coupled to the generating means for adding all of the voltages thus selected, first means connected to the adding means for multiplying the output of the adding means by a constant which is equal to the reciprocal of the square root of the number of identifier positions, means coupled to the first multiplying means for generating the function $$\int_{-6}^{d_m} exp\left(\frac{-x^2}{2}\right)dx$$

where $d_m$ is the output of the multiplying means, and second means for multiplying the generated function by a constant equal to $$\frac{1}{\sqrt{2\pi}}$$

such that the result indicates a particular portion of an associated memory in which the particular item is to be stored.

22. In apparatus for automatically generating a memory address for an individual information item to be stored which is related to the statistical distribution of a set of information items carrying individual item identifiers which may vary in the number of characters contained, means for detecting the occurrence of a blank position in a particular item identifier, counting means responsive to the detecting means for selecting characters from selected positions in the particular item identifier in a predetermined order upon successive occurrences of blank positions therein in order to fill the blank positions as they occur, and means for resetting the counting means each time a new item identifier is presented.

23. In automatic memory generating apparatus which is arranged to operate upon individual item identifiers having equal numbers of characters for the item identifier of a given set, means for supplying characters to fill blank positions in particular item identifiers as they occur so as to maintain an approximate statistical relationship to the distribution of characters within item identifiers of the entire set comprising a search register for storing an individual item identifier, means for sequentially reading out each character of the identifier, a blank detector for detecting the absence of a character in a particular identifier position, counting and gating means responsive to the blank detector for filling succeeding blank positions with characters occurring in different positions of the item identifier in a predetermined order, and means for resetting the counting and gating means when an individual item identifier has been read out of the search register.

24. An information storage system for achieving the storage of information in discrete sections of a memory with a minimum of overflow of stored information from said discrete sections comprising a memory unit having a plurality of information storage sections therein, each bearing a unique section address, transducing means associated with said memory unit for storing information in selected ones of said sections and for reading information out of said sections, a plurality of information items each being identified by a unique identifier having a plurality of alpha-numeric characters, sorting and tabulating means for providing data concerning the statistical distribution of the identifier characters from the plurality of information items, means for representing the normal deviate values derived from the statistical distribution data provided by the sorting and tabulating means, means for generating a section address for a particular information item in response to the item identifier through reference to selected normal deviate values which are related to the particular identifier character as prescribed by the mathematical expression $$\frac{1}{\sqrt{2\pi}}\int_{-6}^{d_m} exp\left(\frac{-x^2}{2}\right)dx$$

where $x$ is a variable of integration and $d_m$ is the standard deviation of the arithmetic mean of the selected normal deviate values, means for positioning the transducing means adjacent the particular section designated by the generated address, means for recognizing available storage space within the selected section, means for storing the information from the individual item in the available space of said selected section, and information retrieval means including means for presenting an individual identifier to the address generating means in order to cause the selection of the particular section containing the corresponding information in response to a section address generated through reference to said corresponding normal deviate values in the manner prescribed by said mathematical expression and means for comparing signals from the selected section with the presented identifier so as to permit the reading of the corresponding information when a match is detected in said comparing means.

25. In a data processing system having a memory provided with addressable locations and a translator for storing and retrieving information items in selected memory locations in accordance with corresponding item addresses, a memory address generator comprising storage means for storing statistically derived parameters representative of the frequency distribution of item identifier characters within the set of items to be stored in the memory, means for selecting from said storage means particular ones of said parameters corresponding to the succeeding characters of a particular item identifier, means for operating upon said selected parameters to derive the value of the standard deviation of the arithmetic means thereof, means for providing a voltage which is substantially representative of the function $$\frac{1}{\sqrt{2\pi}}\int_{-\infty}^{d_m} exp\left(\frac{-x^2}{2}\right)dx$$

where $d_m$ represents said standard deviation, and means for applying said voltage to the translator in order to control the memory location of the corresponding information item with a minimum overflow of stored information.

26. A memory address generator in accordance with claim 25 wherein the operating means comprises means for adding the selected parameter values to provide a composite sum thereof, and first multiplying means for multiplying said sum by the value $$\frac{1}{\sqrt{n}}$$

where $n$ is equal to the number of identifier positions for an individual item identifier.

27. A memory address generator in accordance with claim 26 wherein the voltage providing means includes first integrating means, second integrating means, a timing circuit coupled to the first and second integrating means for applying a variable of integration thereto, connecting means intercoupling the first and second integrating means to generate the function $$\int_{-6}^{d_m} exp\left(\frac{-x^2}{2}\right)dx$$

and second multiplying means connected to the second integrating means for multiplying said generated function by a constant value equal to $$\frac{1}{\sqrt{2\pi}}$$

28. An automatic information indexer for providing a memory address corresponding to an identifier of an information item to be stored in a computer memory comprising a primary register for temporarily storing the particular identifier, data storage means for storing data derived from a statistical analysis of the identifiers belonging to a set of information items to be stored in the memory, a counter connected to the primary register, a data selecting circuit, timing circuits connected to the counter for selecting succeeding identifier positions within the primary register and applying signals to a first input of the data selecting circuit indicative of a selected identifier position, means connecting the primary register to a second input of the data selecting circuit including a decoder for indicating a particular identifier character, means responsive to the data selecting circuit for receiving the particular data selected in correspondence with the identifier stored in the primary register in order to derive a signal representative of the standard deviation of the arithmetic mean of the selected normal deviates, a feedback coupled integrating circuit for providing an integration of the function $$\int_{-6}^{d_m} exp\left(\frac{-x^2}{2}\right)dx$$

where $d_m$ corresponds to the derived standard deviation, and means for multiplying the output of the integrating circuit by the constant $$\frac{1}{\sqrt{2\pi}}$$

to provide a signal representing the memory address corresponding to the identifier stored in the primary register.

29. An information storage system comprising a memory storage unit having a plurality of sections therein, each memory section having a unique memory address; a recording and reading transducer located adjacent the memory storage unit; a plurality of information items to be stored in the memory, each item having a unique identifier, there being a greater number of information items than memory sections; means for generating a memory address corresponding to a particular identifier in accordance with the statistical distribution of identifiers over the set of information items to be stored, the memory address generating means comprising a primary register for temporarily storing the identifier, data storage means for storing data derived from a statistical analysis of the plurality of item identifiers, timing means for sequentially reading out the identifier characters from the primary register, data selecting means for selecting particular stored data in accordance with the particular character found in each identifier position, and means for operating on the selected data in accordance with the mathematical expression $$\frac{1}{\sqrt{2\pi}}\int_{-6}^{d_m} exp\left(\frac{-x^2}{2}\right)dx$$

where $d_m$ is the standard deviation of the arithmetic mean of the selected data, and $x$ is a variable of integration; means for positioning the transducer adjacent the particular memory section designated by the generated memory address; means for locating a selected position within the particular section; first means for storing information corresponding to the particular identifier within the selected section position; and second means for reading out information corresponding to the particular identifier from the selected section position.

No references cited.